United States Patent
Ho et al.

(10) Patent No.: US 6,915,084 B2
(45) Date of Patent: Jul. 5, 2005

(54) OPTICAL COMPENSATOR HAVING COMPENSATION FOR KERR EFFECT PHASE NOISE

(75) Inventors: Keangpo Ho, San Jose, CA (US); Joseph Mardell Kahn, San Carlos, CA (US)

(73) Assignee: StrataLight Communications, Inc., Campbell, CA (US)

( * ) Notice: Subject to any disclaimer, the term of this patent is extended or adjusted under 35 U.S.C. 154(b) by 37 days.

(21) Appl. No.: 10/233,917

(22) Filed: Sep. 3, 2002

(65) Prior Publication Data

US 2004/0042802 A1 Mar. 4, 2004

(51) Int. Cl.[7] ........................ H04B 10/06; H04B 10/16; H04B 10/18
(52) U.S. Cl. ........................ 398/208; 398/158; 398/159; 398/173
(58) Field of Search ................................ 398/173, 174, 398/175, 176, 177, 178, 179, 180, 181, 148, 208, 212, 213, 214; 375/226, 346, 347, 348, 349, 350, 351, 371, 372, 373, 374, 375, 376; 250/201.9; 455/114.3; 330/149

(56) References Cited

U.S. PATENT DOCUMENTS

| | | | | |
|---|---|---|---|---|
| 4,847,477 A | * | 7/1989 | Smith ........................ | 250/201.9 |
| 6,112,062 A | * | 8/2000 | Hans et al. ............... | 455/114.3 |
| 6,246,717 B1 | | 6/2001 | Chen et al. .................. | 375/226 |
| 6,445,752 B1 | | 9/2002 | Jiang et al. .................. | 375/326 |
| 6,489,846 B2 | * | 12/2002 | Hatsugai ..................... | 330/149 |
| 2003/0194240 A1 | * | 10/2003 | Mollenauer et al. ......... | 398/158 |
| 2004/0125435 A1 | * | 7/2004 | Liu et al. .................... | 359/337 |

OTHER PUBLICATIONS

Gabitov, I.R. and P.M. Lushnikov. "Nonlinearity management in a dispersion–managed system." Optics Letters. Jan. 15, 2002, vol. 27, No. 2: 113–115.*

Murakami, M. and S. Saito. "Evolution of field spectrum due to fiber–nonlinearity–induced phase noise in in–line optical amplifier systems." IEEE Photonics Technology Letters. Nov. 1992, vol. 4, No. 11: 1269–1272.*

Pare, C., et al. "Compensating for dispersion and the nonlinear Kerr effect without phase conjugation." Optics Letters. Apr. 1, 1996, vol. 21, Issue 7: 459–461.*

C. Xu, L. Mollenauer, Xiang Liu, "Compensation of nonlinear self–phase modulation with phase modulators", Electronic Letters, published Nov. 21st, 2002, pp. 1578–1579, vol. 38 No. 24.

(Continued)

*Primary Examiner*—Jason Chan
*Assistant Examiner*—David S. Kim
(74) *Attorney, Agent, or Firm*—David R. Gildea

(57) ABSTRACT

A method and apparatus for reducing nonlinear phase noise that is induced in an optical transmission system by the interaction of optical amplifier noise and Kerr effect. The apparatus includes an intensity-scaled nonlinear phase noise compensator. The phase noise compensator reduces the nonlinear phase noise by rotating a phase estimate by a scaled signal strength estimate for the optical signal or by comparing a complex estimate to curved regions having scaled nonlinear decision boundaries. The scale factor is derived from the number of spans in the transmission system. Another embodiment of the phase noise compensator uses the scaled signal strength for re-modulating an optical signal.

18 Claims, 14 Drawing Sheets

OTHER PUBLICATIONS

Xiang Liu, Xing Wei, Richart E. Slusher, C. J. McKinstrie, "Improving transmission performance in differential phase–keyed systems by use of lumped nonlinear phase–shift compensation", Optics Letters, published Sep. 15, 2002, pp. 1616–1681, vol. 27 No. 18, Optical Society of America.

Chris Xu & Xiang Liu, "Postnonlinearity compensation with data–driven phase modulators in phase–shift keying transmission", Optics Letters, published Sep. 15, 2002, pp. 1619–1621, vol. 27 No. 18, Optical Society of America.

J. P. Gordon and L. F. Mollenhauer, "Phase noise in photonic communications systems using linear amplifiers", Optics Letters, Dec. 1, 1990, pp. 1351–1353, vol. 15–No. 23, Optical Society of America.

* cited by examiner

OPTICAL COMPENSATOR HAVING COMPENSATION FOR KERR EFFECT PHASE NOISE

BACKGROUND OF THE INVENTION

1. Field of the Invention

The present invention relates generally to optical transmission systems and more particularly to apparatus and methods for reducing the effect of nonlinear phase noise caused by the interaction of optical amplifier noise and Kerr effect.

2. Description of the Prior Art

For a system with many fiber spans having an optical amplifier in each span to compensate for fiber loss, a simplified mathematical description assumes that each optical amplifier launches the same average signal power and each fiber span has the same length. The launched signal, represented by baseband equivalent electrical field entering the first span is to $E_1 = E_0 + n_1$, where $E_0$ is the baseband representation of the transmitted electrical signal as a complex number and $n_1 = x_1 + jy_1$ is the baseband representation of optical amplifier noise as zero-mean complex Gaussian noise with variance of $E\{|n_1|^2\} = 2\sigma^2$, where $\sigma^2$ is the noise variance per span per dimension and $E\{.\}$ denotes expectation. In the representation $n_1 = x_1 + jy_1$, the quadrature components $x_1$ and $y_1$ are zero-mean real Gaussian noise with variances $E\{|x_1|^2\} = E\{|y_1|^2\} = \sigma^2$. The simplest phase-modulated system uses binary phase shift keyed (BPSK) modulation where the binary "0" and "1" are modulated onto a carrier by a carrier phase shift of 0 or $\pi$, respectively. For a BPSK system, $E_0 = +A$ or $-A$ when "1" or "0" is transmitted, respectively, where A is a real number for the amplitude of the transmitted signal.

After the first in-line amplifier, the launched signal entering the second span is equal to $E_2 = E_0 + n_1 + n_2$, where $n_2$ is the amplifier noise from the optical amplifier of the second span. The statistical properties of $n_2$ are the same as those of $n_1$. At the end of amplifier chain after the Nth fiber span the signal becomes $E_N = E_0 + n_1 + \ldots + n_N$ entering the Nth fiber span with noise from all N amplifiers, where $n_k$, k=1 ... N, is the noise from the kth fiber span, which has the same statistical properties as $n_1$. For a simplified mathematical description, one may assume that the signal arriving at the receiver is equal to $E_N$ by ignoring the fiber loss of the last fiber span and the optical amplifier required to compensate for it.

FIG. 1 is an exemplary vector representation of a BPSK signal of "1" or "0" having constellation points with a phase of either 0 or $\pi$, respectively. Of course, any two phases that are separated by $\pi$ may be used to represent "1" and "0". The vector representation is shown on a complex plane having an x-axis 12, a y-axis 13, and an origin 14 at the intersection of the x and y axes 12 and 13. The signal "1" is transmitted as represented by a vector 15. A vector 16 represents amplifier noise of a complex number of $n_1 + \ldots + n_N$ in the absence of other effects. A vector 17 represents a received signal $E_N$ 15 with the effect of amplifier noise 16 without including an interaction of the amplifier noise and Kerr effect.

In this application the interaction of the amplifier noise and the Kerr effect is called Kerr effect phase noise. Gordon and Mollenauer in "Phase noise in photonic communications systems using linear amplifiers," *Optics Letters*, vol. 15, no. 23, pp. 1351–1353, Dec. 1, 1990 describe the effects of the interaction of optical amplifier noise with Kerr effect in an optical fiber communication system. With the Kerr effect, the refractive index of an optical fiber increases linearly with the optical intensity in the fiber. In each span of optical fiber, the Kerr effect phase noise is equal to $-\gamma L_{eff} P$, where $\gamma$ is the nonlinear coefficient of the optical fiber, $L_{eff}$ is the effective nonlinear length per span, and P is the optical intensity. The unit of electrical field is defined herein such that the optical intensity or power is equal to the absolute square of electric field. The nonlinear phase shift is usually represented by a negative phase shift in majority of the literature. The usage of positive phase shift does not change the physical meaning of the nonlinear phase shift. Herein, unless otherwise noted, the notation of negative phase shift is used.

A nonlinear phase noise is accumulated span after span due to the Kerr effect phase noise. The accumulated nonlinear phase noise is shown in an equation 1 below as nonlinear phase shift $\phi_{NL}$, and denoted as an angle 18:

$$\phi_{NL} = -\gamma L_{eff}\{|E_0+n_1|^2 + |E_0+n_1+n_2|^2 + \ldots + |E_0+n_1+\ldots+n_N|^2\}. \quad (1)$$

The nonlinear phase shift $\phi_{NL}$ 18, which can also be represented by an electric field change vector 19, results in a received signal 20, which is the vector $E_N$ 17 rotated by the nonlinear phase shift $\phi_{NL}$ 18. Mathematically, the actual received electrical field 20 is $E_R = E_N \exp(j\phi_{NL})$. Because the actual received signal 20 is the rotated version of the signal plus noise vector 17, the intensity of the received signal 20 does not change due to nonlinear phase shift, i.e., $P_N = |E_N|^2 = |E_R|^2$.

In a long transmission system with many fiber spans, both the noise vector 16 and the nonlinear phase shift $\phi_{NL}$ 18 are accumulated span after span. The incremental nonlinear phase noise angle of the kth span is $-\gamma L_{eff}|E_0+n_1+\ldots+n_k|^2$ and is affected by the accumulated noise to that span of $n_1 + \ldots + n_k$. Therefore, the nonlinear phase shift $\phi_{NL}$ 18 has a noisy component.

FIG. 2 shows a complex scattergram pattern, referred to with a reference 25, of a baseband representation of a received optical BPSK signal in the "1" state transmitted as $E_0 = +A$. The pattern 25 is plotted with 5000 noise simulation points. Each instance of the simulated complex field is graphed in the scattergram pattern 25 with real part as the x-axis 12 and imaginary part as the y-axis 13, and is represented as a single point according to the formula $E_N \exp(j\phi_{NL} - j<\phi_{NL}>)$ which is equal to $E_R \exp(-j<\phi_{NL}>)$ with a mean nonlinear phase shift $<\phi_{NL}>$ of about 1 radian taken out. The points of the scattergram pattern 25 are similar to the end of the vector of 20 where the whole figure is rotated by minus the angle of the mean nonlinear phase shift $<\phi_{NL}>$. The scattergram pattern 25 shows a random scattering of the simulation points due to contamination by the amplifier noise 16 and a shape having the appearance of a section of a helix due to the nonlinear phase shift of $\phi_{NL} - <\phi_{NL}>$. FIG. 2 indicates that the rotation of the nonlinear phase shift of $\phi_{NL} - <\phi_{NL}>$ is correlated to the distance from the origin 14. In general, the farther the points are from the origin 14, the more the rotation about the origin 14.

Conventionally, as described widely in literature, the BPSK signal is detected by determining whether the signal is in the right or left of the y-axis 13, for "1" and "0", respectively. A conventional detector viewed as a polar detector determines whether the absolute value of the received phase $\theta$ is less than $\pi/2$ for "1" or greater than $\pi/2$ for "0". A conventional detector viewed as a rectangular detector determines whether one of the quadrature components, $\cos(\theta)$, is positive or negative for "1" or "0", respectively. In the conventional detectors, the intensity of the received signal need not be known in the detection process.

After taking out the mean $<\phi_{NL}>$ of the nonlinear phase shift $\phi_{NL}$ 18, Gordon and Mollenauer determine whether the signal is in the right or left of the y-axis 13 with the conventional phase detector. With the assumption of the conventional phase detector, Gordon and Mollenauer arrive at an estimation that the nonlinear phase shift mean $<\phi_{NL}>$ should be about less than 1 radian. This requirement of mean nonlinear phase shift $<\phi_{NL}>$ limits the transmission distance of an optical transmission system.

There is a need for a method and apparatus to overcome the interaction of optical amplifier noise and Kerr effect in order to extend transmission distance.

SUMMARY OF THE INVENTION

The present invention provides a method and apparatus in an optical system using an estimate of signal strength for reducing the effect of nonlinear phase noise induced by the interaction of amplifier noise and Kerr effect.

In a preferred embodiment, a receiver of the present invention includes a complex signal estimator and an intensity-scaled phase noise compensator. The complex signal estimator provides an estimate of the complex components of a received optical signal. The complex components may be in a polar form of phase and signal strength or a rectangular form of real and imaginary terms. The phase noise compensator uses signal strength for compensating for the nonlinear phase noise in the complex components in order to provide a phase noise compensated representation of the optical signal. In one variation the phase noise compensator includes a rotator for rotating the complex components by a scaled signal strength and a data detector using the rotated complex components for detecting modulation data. In another variation the phase noise compensator includes a curved region detector having curved regions. The curved regions have nonlinear decision boundaries based upon a scale factor. The curved region detector detects data by determining the region that encloses the complex components. The complex components and the signal strength may be differential between symbol periods.

In another preferred embodiment, a receiver of the present invention includes a frequency estimator and an intensity-scaled phase noise compensator. The phase noise compensator shifts an estimated frequency by a scaled signal strength for compensating for nonlinear phase noise in a received optical signal.

In another preferred embodiment, an intensity-scaled phase noise compensator of the present invention compensates for nonlinear phase noise phase by re-modulating an optical signal with a scaled signal strength.

The signal strength scale factor of the present invention is determined based upon the number of spans in an optical transmission system.

The present invention eliminates a portion of the Kerr effect phase noise that is due to the interaction of optical amplifier noise and Kerr effect. The variance of the residual nonlinear phase shift with correction is reduced to approximately one fourth of that of the variance of the received nonlinear phase shift without correction. The methods and apparatus of the present invention described herein can be used in an optical transmission system to approximately double the transmission distance by doubling the number of spans by allowing the transmission system to accumulate about twice the mean nonlinear phase if the noisy nonlinear phase shift is the dominant degradation. Alternatively, the lengths of the spans can be increased. For a fiber loss coefficient of 0.20 dB/km the lengths of the spans can be increased by about 15 kilometers by doubling the launched power per span.

Various preferred embodiments of the present invention will now be described in detail with reference to the accompanying drawings, which are provided as illustrative examples.

IN THE DRAWINGS

DETAILED DESCRIPTION OF THE PREFERRED EMBODIMENTS

Figure 1:
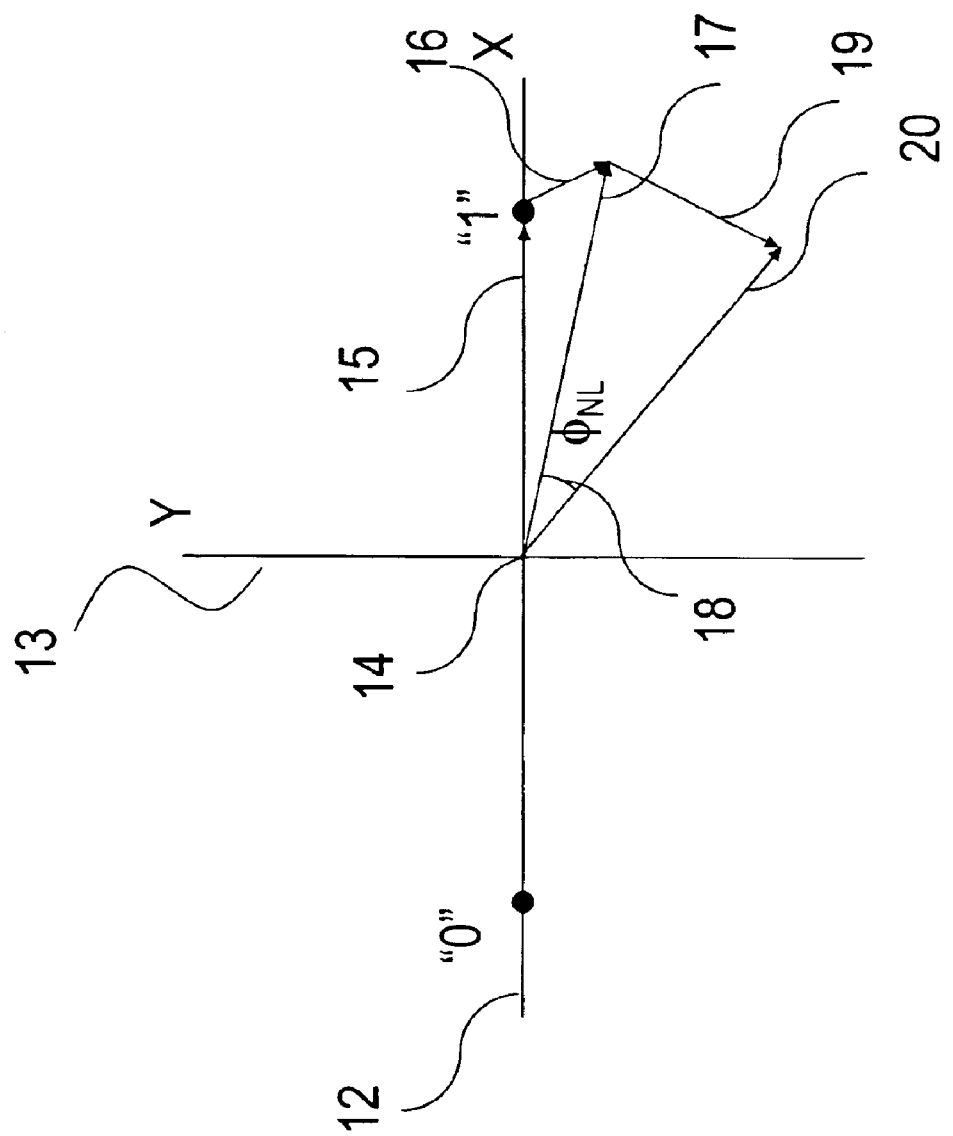
FIG. 1 is a vector diagram of the prior art illustrating the effect of optical amplifier noise and nonlinear Kerr effect phase shift in a phase-modulated system.
Figure 2:
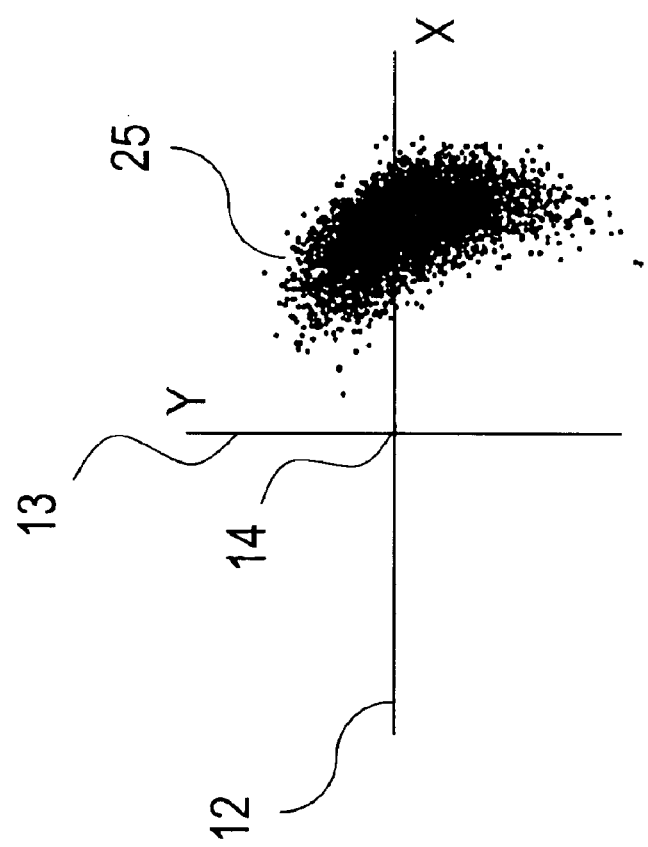
FIG. 2 is a scattergram of the prior art illustrating the nonlinear phase noise that is generated by the interaction of optical amplifier noise and Kerr effect in a phase-modulated system.

The present invention provides a method and apparatus for detecting phase modulated data of the received optical signal of an optical transmission system where the received phase is contaminated by the nonlinear phase noise induced by the interaction optical amplifier noise and Kerr effect of an optical fiber. The method and apparatus use the idea that the nonlinear phase shift 18 (FIG. 1) is correlated with the intensity of the received signal related to the lengths of vectors 17, 20 (FIG. 1). The present invention is based on the idea that the nonlinear phase shift is correlated with the received intensity. While both the nonlinear phase shift and the received intensity have noisy components, those noisy components are correlated and we use one to partially cancel another.

The correlation is more obvious in a brief mathematical explanation given below for illustrative purposes. For the simple example of two fiber spans, the received electric field signal is $E_2 = E_0 + n_1 + n_2$ and the nonlinear phase shift is $\phi_{NL} = -\gamma L_{eff}(|E_0+n_1|^2 + |E_0+n_1+n_2|^2)$. The conventional method, which detects the phase according to the received electric field $E_2 \exp(j\phi_{NL})$, gives a phase of $\phi_2 = \theta_2 + \phi_{NL} = \theta_2 - \gamma L_{eff}(|E_0+n_1|^2 + |E_0+n_1+n_2|^2)$, where $\theta_2$ is the phase of $E_2$. Because the received signal intensity is $P_2 = |E_0+n_1+n_2|^2$, the effects of nonlinear phase shift can be reduced by estimating the phase by $\phi_2 + \gamma L_{eff} P_2 = \theta_2 - \gamma L_{eff}|E_0+n_1|^2$ by adding a correction term of $\gamma L_{eff} P_2$ into the estimated phase of the received signal of $E_2 \exp(j\phi_{NL})$. The effects of nonlinear phase shift can be reduced further because the remaining nonlinear phase shift of $-\gamma L_{eff}|E_0+n_1|^2$ is still correlated with the intensity $P_2 = |E_0+n_1+n_2|^2$. As shown later, the optimal correction term for two spans is about $1.5\gamma L_{eff} P_2$.

For the general case of an optical transmission system with N spans, mathematically the optimal way to add a correction term is to find an optimal scale factor $\alpha$ to minimize the variance of the residual nonlinear phase shift $\phi_{NL} + \alpha P_N$, where $P_N = |E_N|^2 = |E_0+n_1+ \ldots +n_N|^2$ is the received signal intensity at the receiver. After some algebra, the optimal factor is $\alpha$, is shown in an equation 2 below. The approximation in the equation 2 is valid for high signal-to-noise ratio.

$$\alpha = \gamma L_{eff} \frac{N+1}{2} \cdot \frac{|E_0|^2 + (2N+1)\sigma^2/3}{|E_0|^2 + N\sigma^2} \approx \gamma L_{eff} \frac{N+1}{2} \quad (2)$$

Figure 3:
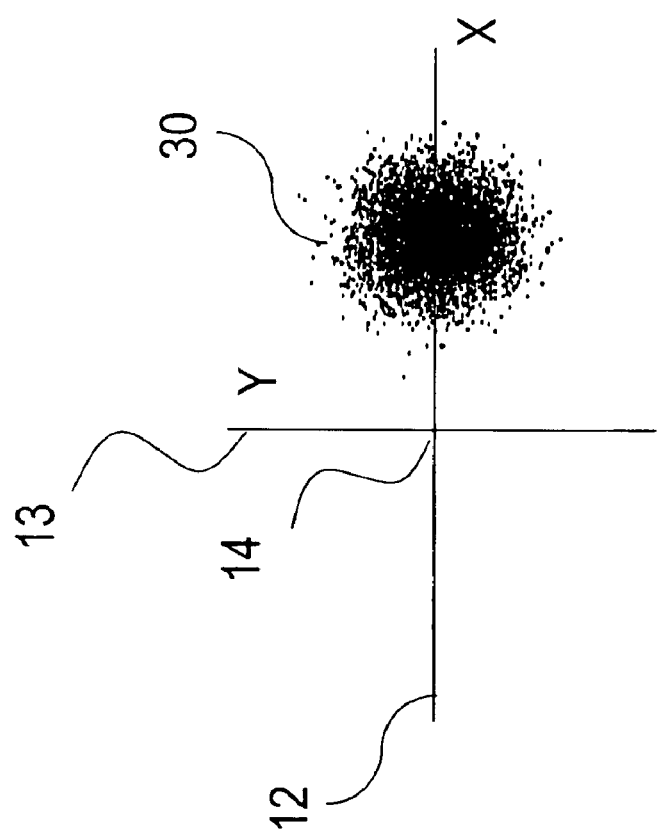
FIG. 3 is a scattergram illustrating the effect of the compensation of the present invention for reducing the nonlinear phase noise of FIG. 2.

FIG. 3 shows a complex scattergram pattern 30 for the present invention. The scattergram pattern 30 is a baseband representation of a received optical BPSK signal in the "1" state transmitted as $E_0 = +A$. The pattern 30 is generated from 5000 simulation points for different noise combinations having nonlinear phase compensation according to the present invention. Each instance of the simulated complex field is graphed with real part as the x-axis 12 and imaginary part as the y-axis 13, and is represented as a single complex point according to the formula $E_c = E_N \exp(j(\phi_{NL}+\alpha P_N) - j<\phi_{NL}> - j\alpha<P_N>)$ as the electrical field after correction with residual nonlinear phase shift of $\phi_{NL}+\alpha P_N$ with the mean taken out.

For the typical case with small noise, the mean nonlinear phase shift $<\phi_{NL}>$ is about $N\gamma L_{eff}|E_0|^2$ and a mean received power of about $|E_0|^2$, the optimal scale factor $\alpha$ for large number N of fiber spans is about 50% of the ratio of mean nonlinear phase shift $<\phi_{NL}>$ and the mean received power $|E_0|^2$. As compared with the helix shaped scattergram pattern 25 of the prior art, the roughly round shape of the scattergram pattern 30 shows that the effect of the nonlinear phase shift 18 has been reduced. Comparing the prior art scattergram pattern 25 and the present invention scattergram pattern 30, the effect of nonlinear phase shift $\phi_{NL}$ 18 is reduced dramatically by using the correction term of $\alpha P_N$. It should be noted, however, that the effect of the nonlinear phase shift $\phi_{NL}$ 18 is not entirely eliminated in the present invention.

The parameter that can be used to characterize the effect of phase correction is to compare the variance of var($\phi_{NL}+\alpha P_N$) for residual nonlinear phase shift with the variance of var($\phi_{NL}$) for the original nonlinear phase shift. As a good approximation for large optical signal-to-noise ratio and large number N of fiber spans, the ratio of var($\phi_{NL}+\alpha P_N$)/var($\phi_{NL}$) is about ¼, giving a reduction of about 50% in terms of standard deviation. Typically, the mean nonlinear phase shift $<\phi_{NL}>$ is approximately equal to $N\gamma L_{eff}|E_0|^2$, the variance of nonlinear phase shift var($\phi_{NL}$) is approximately equal to $4N^3(\gamma L_{eff}\sigma|E_0|)^2/3$, and the variance of residual nonlinear phase shift var($\phi_{NL}+\alpha P_N$) is approximately equal to $N^3(\gamma L_{eff}\sigma|E_0|)^2/3$. With a given signal-to-noise ratio at the receiver, the variance of nonlinear phase shift var($\phi_{NL}$) is approximately equal to $2<\phi_{NL}>^2/(3SNR)$ and the variance of residual nonlinear phase shift var($\phi_{NL}+\alpha P_N$) is approximately equal to $<\phi_{NL}>^2/(6SNR)$, where $SNR=|E_0|^2/(2N\sigma^2)$ is the signal-to-noise ratio (SNR). As the standard deviation of nonlinear phase shift is proportional to the mean nonlinear phase shift $<\phi_{NL}>$, we can conclude that the system with the correction of nonlinear phase shift can allow twice the mean nonlinear phase shift $<\phi_{NL}>$, which corresponds to doubling the transmitted distance by doubling the number N of fiber spans.

The above description assumes that the launched power in each span is identical, the fiber in each span has the same length, and the optical amplifier noise in each span has the same statistical properties. For a more general system, the optimal scale factor $\alpha$ is equal to about 50% of the ratio of mean nonlinear phase shift and received power. The above description also assumes that the received signal is equal to the optical signal entering the last span. If the received signal after the last span is amplified using an optical amplifier with optical amplifier noise before the receiver, assume that the received power is equal to the launched power per span, the above discussion is still valid by changing N to N+1 for the equation 2 with one more amplifier. In the above model, with the optimal correction term $\alpha P_N$, the last span does not introduce nonlinear phase shift $\phi_{NL}$. Equivalently, an optical amplifier before the receiver also does not introduce non-linear phase shift $\phi_{NL}$. The importance of the current invention is that the use of the correction term of $\alpha P_N$ reduces the effect of nonlinear phase shift $\phi_{NL}$ 18. The present invention can be implemented by using various methods and apparatus.

The term "complex components" is used herein to mean a phase and a (positive) signal strength in a polar coordinate system or two signal (positive or negative) components in a rectangular coordinate system. The two components in the rectangular coordinate system are typically real and imaginary quadrature components or in-phase and quadrature-phase parts of the signal. However, the two components can be any two components that are not phase coincident. The "signal strength" of a signal may be in units of power or magnitude where magnitude is the positive square root of power. Information may be converted back and forth between units of power and magnitude with conventional circuit or software techniques. The complex components and the signal strength may represent a signal during a certain time or may represent a difference in the signal between two times as in a differential phase, differential quadrature components, or differential signal strength.

Figure 4:
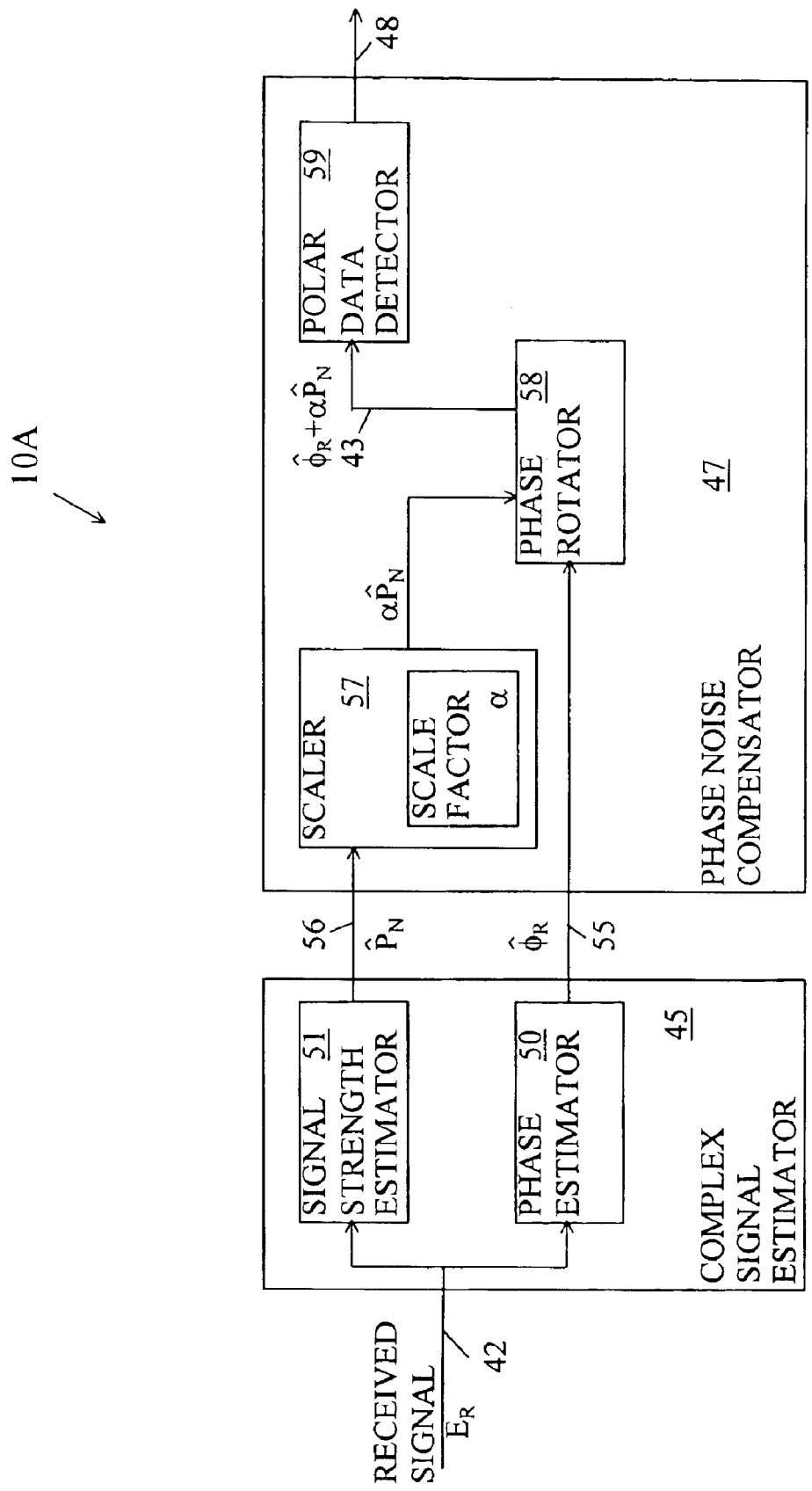
FIG. 4 is a block diagram of a receiver of the present invention having a phase estimator and an intensity-scaled phase noise compensator.

FIG. 4 is a block diagram of a receiver of a preferred embodiment of the present invention referred to by a reference identifier 10A. The receiver 10A receives the optical signal $E_R$ 42 and provides a nonlinear compensated phase, denoted by 43, having a reduced level of unwanted nonlinear phase noise. The compensated phase 43, shown below as $\hat{\phi}_R + \alpha \hat{P}_N$, is a phase noise compensated representation of the received optical signal $E_R$ 42.

The receiver 10A includes a complex signal estimator 45 for receiving the optical signal $E_R$ 42 and an intensity-scaled phase noise compensator 47 for providing detected data 48. The complex signal estimator 45 includes a phase estimator 50 and a signal strength estimator 51. The phase estimator 50 estimates the actual phase $\phi_R$ of the optical signal $E_R$ 42 for providing an estimated phase $\hat{\phi}_R$ 55. The phase $\hat{\phi}_R$ 55 is preferably the estimated difference between the phase $\phi_R$ of the optical signal $E_R$ 42 and a mean $<\phi_R>$ of that phase. The signal strength estimator 51 estimates the actual power $P_N = |E_N|^2 = |E_R|^2$ in the received optical signal $E_R$ 42 for providing an estimated power $\hat{P}_N$ 56. Preferably, the power $\hat{P}_N$ 56 is the estimated difference between the power $P_N$ of the optical signal $E_R$ 42 and a mean $<P_N>$ of that power.

The phase noise compensator 47 includes a scaler 57, a phase rotator 58, and a polar data detector 59. Information for the scale factor $\alpha$ is stored by the scaler 57. The scaler 57 multiplies the estimated power $\hat{P}_N$ 56 by the scale factor $\alpha$ and passes the estimated phase $\hat{\phi}_R$ and a scaled signal strength $\alpha \hat{P}_N$ to the phase rotator 58. The phase rotator 58 adds the scaled signal strength $\alpha \hat{P}_N$ to the phase $\hat{\phi}_R$ in order to rotate the phase $\hat{\phi}_R$ by $\alpha \hat{P}_N$. The rotated phase $\hat{\phi}_R + \alpha \hat{P}_N$ is the nonlinear compensated phase 43. The polar data detector 59 uses the nonlinear compensated phase $\hat{\phi}_R + \alpha \hat{P}_N$ 43 for detecting the modulated data that is carried on the optical signal $E_R$ 42 and issuing the estimate as the detected data 48.

For BPSK modulation, the polar data detector 59 uses $\pi/2$ as a decision boundary. While the current invention and all previous prior arts can be generalized to more complicated phase-modulated system, or its variations combined with amplitude and/or frequency modulation, we use BPSK system as our preferred example. In the simple case of BPSK, the polar data detector 59 makes the decision whether "1" or "0" is transmitted by the criterion of whether the absolute value of the compensated phase 43 is less than $\pi/2$ for "1" or greater than $\pi/2$ for "0". The polar detector 59 may require other information to make a decision if the original data is not only phase modulated, but also encoded in amplitude or frequency.

The signal strength estimator 51 and the phase estimator 50 may be implemented as two separate blocks or combined into a single circuit or block. In some literature, the nonlinear phase shift $\phi_{NL}$ 18 is described as a positive phase shift. The scale factor $\alpha$ is negative in the specific case in which the nonlinear phase shift is regarded as being a positive phase shift.

Figure 5:
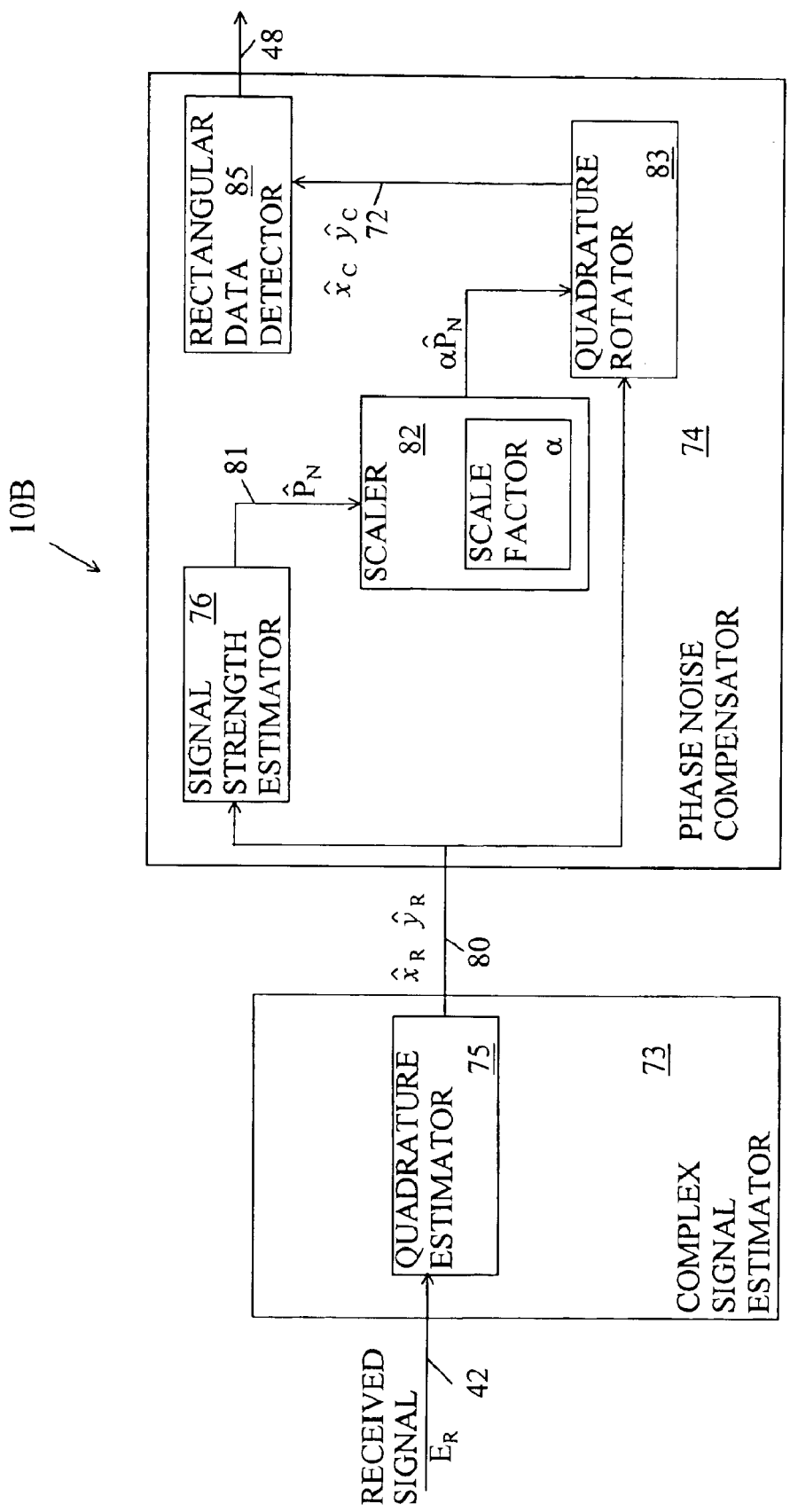
FIG. 5 is a block diagram of a receiver of the present invention having quadrature estimator and an intensity-scaled phase noise compensator.

FIG. 5 is a block diagram of a receiver of another preferred embodiment of the present invention referred to by a reference identifier 10B. The receiver 10B receives the optical signal $E_R$ 42 and provides nonlinear phase noise compensated quadrature components $\hat{x}_c$ and $\hat{y}_c$, denoted by 72, having a reduced level of unwanted nonlinear phase noise. The phase noise compensated quadrature components $\hat{x}_c$ and $\hat{y}_c$, 72 are a phase noise compensated representation of the received optical signal $E_R$ 42.

The receiver 10B includes a complex signal estimator 73 for receiving the electric field of the optical signal $E_R$ 42 and an intensity-scaled phase noise compensator 74 for providing the detected data 48. The complex signal estimator 73 includes a quadrature estimator 75. The quadrature estimator 75 estimates the actual quadrature components $x_R$ and $y_R$ of the optical signal $E_R$ 42 for providing estimated quadrature components $\hat{x}_R$ and $\hat{y}_R$ 80. The phase noise compensator 74 includes a signal strength estimator 76. The signal strength estimator 76 uses the quadrature components $\hat{x}_R$ and $\hat{y}_R$ 80 for estimating power of the received signal $E_R$ 42 to provide an estimated power $\hat{P}_N = \hat{x}_R^2 + \hat{y}_R^2$, denoted by 81. In an alternative embodiment the signal strength estimator 76 determines the estimated power $\hat{P}_N$ directly from the optical signal $E_R$ 42.

The phase noise compensator 74 also includes a scaler 82, a quadrature rotator 83, and a rectangular data detector 85. Information for the scale factor $\alpha$ is stored by the scaler 82. The scaler 82 multiplies the power $\hat{P}_N$ 81 by the scale factor $\alpha$ and passes the quadrature components $\hat{x}_R$ and $\hat{y}_R$ and a scaled signal strength $\alpha \hat{P}_N$ to the quadrature rotator 83. The quadrature rotator 83 rotates the quadrature estimates $\hat{x}_R$ and $\hat{y}_R$ by the scaled signal strength $\alpha \hat{P}_N$ according to an equation 3, below, for providing the nonlinear phase noise compensated quadrature components $\hat{x}_c$ and $\hat{y}_c$ 72.

$$\hat{x}_c = \hat{x}_R \cos(\alpha \hat{P}_N) - \hat{y}_R \sin(\alpha \hat{P}_N)$$

$$\hat{y}_c = \hat{x}_R \sin(\alpha \hat{P}_N) + \hat{y}_R \cos(\alpha \hat{P}_N) \qquad (3)$$

The rectangular data detector 85 uses the phase noise compensated quadrature components $\hat{x}_c$ and $\hat{y}_c$ 72 for providing the detected data 48 that is representative of the original encoded or modulated data that is carried on the optical signal $E_R$ 42.

In the simple case of BPSK, the rectangular data detector 85 makes the decision whether "1" or "0" is transmitted by the criterion whether one of the quadrature components $\hat{x}_c$ of the compensated phase representation 72 is positive or negative, respectively. In the case of phase and amplitude modulation called quadrature-amplitude modulation (QAM) or the case of M-ary phase-shift keying (MPSK), both quadrature components of $\hat{x}_c$ and $\hat{y}_c$ 72 are required for the detector 85 to provide the detection data 48. The rectangular data detector 85 can be implemented as a traditional quadrature detector for the specific modulation technique.

Figure 6:
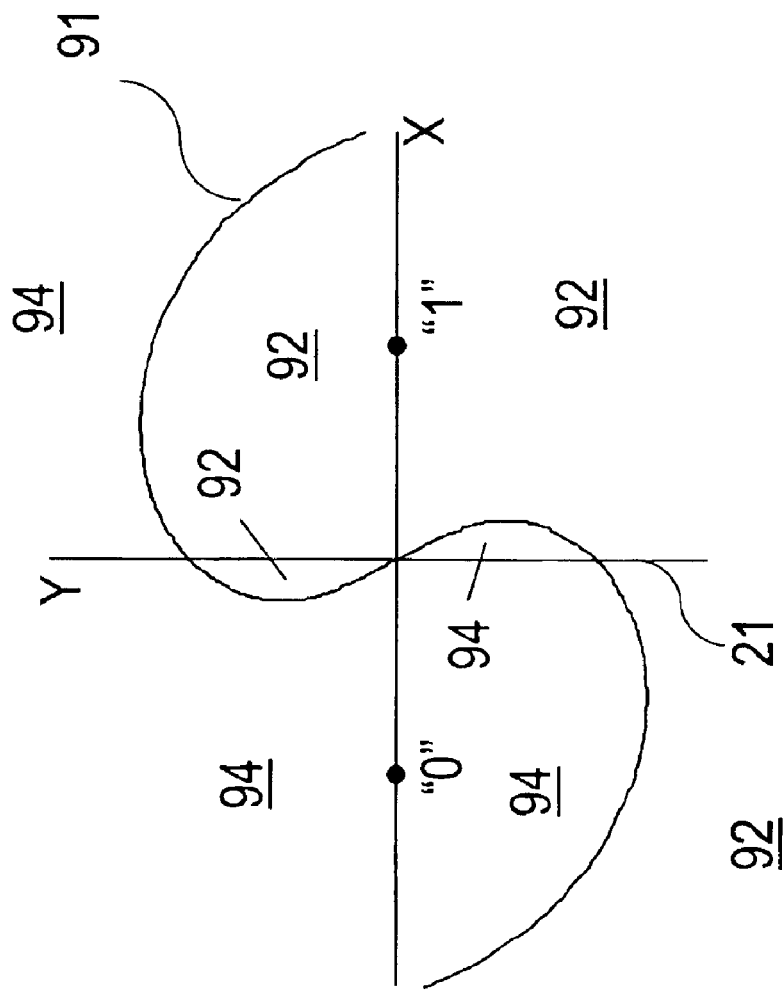
FIG. 6 is an illustration showing a nonlinear decision boundary of the present invention.

FIG. 6 shows an optimal nonlinear decision boundary 91 separating received signal-space into curved regions 92 and 94. The region 92 containing the signal point of "1" is the decision region to determine when "1" is transmitted. The region 94 containing the signal point of "0" is the decision region to determine when "0" is transmitted. The curved regions 92 and 94 can be used for detecting the data 48 from the estimated quadrature components of $\hat{x}_R$ and $\hat{y}_R$ 80 (FIG. 5). The boundary 91 has a rotation angle for a mean nonlinear phase shift $<\phi_{NL}>$. However, in order to make the idea of the present invention easier to understand, the boundary 91 and the signal points "1" and "0" are plotted without showing this rotation. If the mean nonlinear phase shift $<\phi_{NL}>$ were shown, the boundary 91 and the signal points "1" and "0" would be rotated by the angle $<\phi_{NL}>$.

After taking away the constant nonlinear phase shift of $<\phi_{NL}>$, for a BPSK system, the decision region 92 for "1" is $\hat{x}_R \sin[\alpha(\hat{x}_R^2+\hat{y}_R^2)] + \hat{y}_R \cos[\alpha(\hat{x}_R^2+\hat{y}_R^2)] \geq 0$ and the decision region 94 for "0" is $\hat{x}_R \sin[\alpha(\hat{x}_R^2+\hat{y}_R^2)] + \hat{y}_R \cos[\alpha(\hat{x}_R^2+\hat{y}_R^2)] \geq 0$. The decision regions 92 and 94 can also be expressed in polar coordinates. In polar coordinates the decision region 92 for "1" is $|\hat{\phi}_R + \alpha \hat{\rho}_R^2| \leq \pi/2$ and the decision region 94 for "0" is $|\hat{\phi}_R + \alpha \hat{\rho}_R^2| > \pi/2$, where $\hat{\rho}_R = (\hat{y}_R^2 + \hat{x}_R^2)^{1/2}$ and $\hat{\phi}_R = \tan^{-1}(\hat{y}_R/\hat{x}_R)$ is the polar coordinate representation of the rectangular representation of $\hat{x}_R$ and $\hat{y}_R$.

The optimal shape of the boundary 91 depends upon the scale factor $\alpha$. The boundary 91 is drawn for an optical transmission system using BPSK modulation and having a mean nonlinear phase shift $<\phi_{NL}>$ of about 1 radian. In the case of mean nonlinear phase shift $<\phi_{NL}>=0$, the boundary 91 becomes, in rectangular coordinates, the y-axis 13. In polar coordinates, the boundary 91 is $\phi + \alpha \rho^2 = 0$, where $\rho > 0$ is the radius and $\phi$ is the angle.

For QAM or MPSK modulation, instead of the single boundary curve 91 to separate the entire complex space into two decision regions, there are multiple curves to separate the complex space into M decision regions, where M is the number of constellation points in the modulation scheme. For MPSK, the curves that separate the M decision regions are the rotated version of the curve of $\phi+\alpha\rho^2=0$. For QAM, the curves that separated the M decision regions are the rotated version of a family of curves defined by $\rho \sin(\phi+\alpha\rho^2)=\beta$, where $\beta$ is a constant to define different curve. The special case of $\beta=0$ is the curve of $\phi+\alpha\rho^2=0$. For example, for 16-QAM modulation with 16 constellation points in a square arrangement, the decision regions are separated by the rotated versions of two curves of $\phi+\alpha\rho^2=0$ and $\rho \sin(\phi+\alpha\rho^2)=\beta_1$, where $\beta_1$ is a constant.

In practice, the curved regions 92 and 94 touching at the decision boundary 91 can be implemented using a look-up table. The look-up table can be implemented for either complex quadrature components $\hat{x}_R$ and $\hat{y}_R$, or magnitude and phase components of $\hat{\rho}_R$ and $\hat{\phi}_R$, where $\rho_R$ corresponds to the radius $\rho$. The magnitude $\hat{\rho}_R$ is the square root of $\hat{P}_N$. As the magnitude $\hat{\rho}_R$ is always positive in our case, the look-up table can also be implemented using the estimated power and phase of the received signal of $\hat{P}_N=\hat{\rho}_R^2$ and $\hat{\phi}_R$ respectively, by a simple one-to-one mapping.

Figure 7:
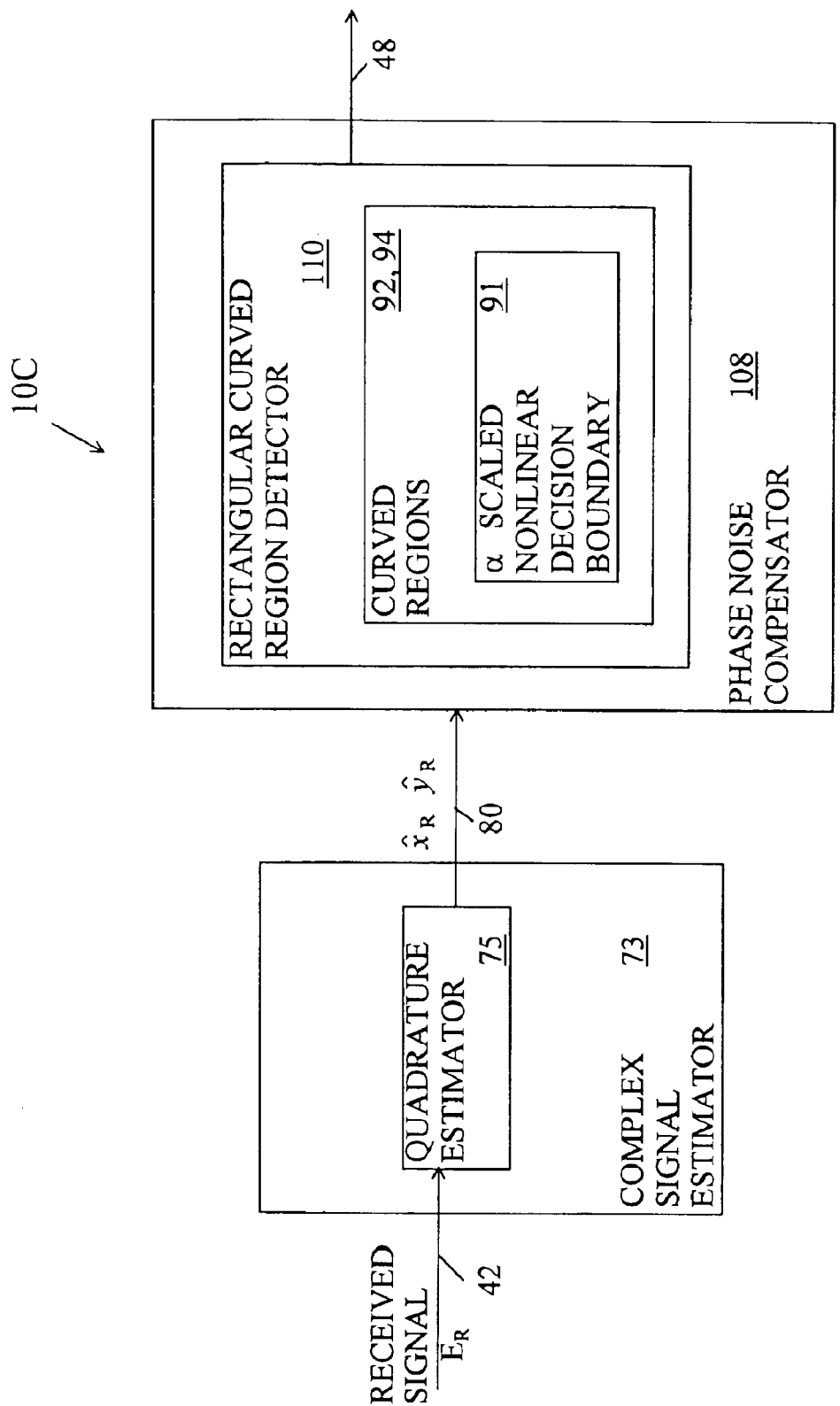
FIG. 7 is a block diagram of a receiver of the present invention having a quadrature estimator and an intensity-scaled nonlinear phase noise compensator using the nonlinear decision boundary of FIG. 6.

FIG. 7 is a block diagram of a receiver of the present invention referred to by a reference identifier 10C. The receiver 10C receives the optical signal $E_R$ 42 and uses one or more of the nonlinear decision boundary curves 91 (FIG. 6) with the estimated quadrature components $\hat{x}_R$ and $\hat{y}_R$ 80 for providing detected data 48 having a reduced level of unwanted nonlinear phase noise. The detected data 48 is a nonlinear phase noise compensated representation of the optical signal $E_R$ 42.

The receiver 10C includes the complex estimator 73 including the quadrature estimator 75 and a phase noise compensator 108. The quadrature estimator 75 receives the optical signal $E_R$ 42 and provides the estimated quadrature components $\hat{x}_R$ and $\hat{y}_R$ 80. The phase noise compensator 108 includes a rectangular curved region detector 110 having stored information for the curved regions 92 and 94. The region detector 110 issues the detected data 48 according to which particular one of the curved regions 92 and 94 encloses the complex location of the quadrature components $\hat{x}_R$ and $\hat{y}_R$ 80.

Figure 8:
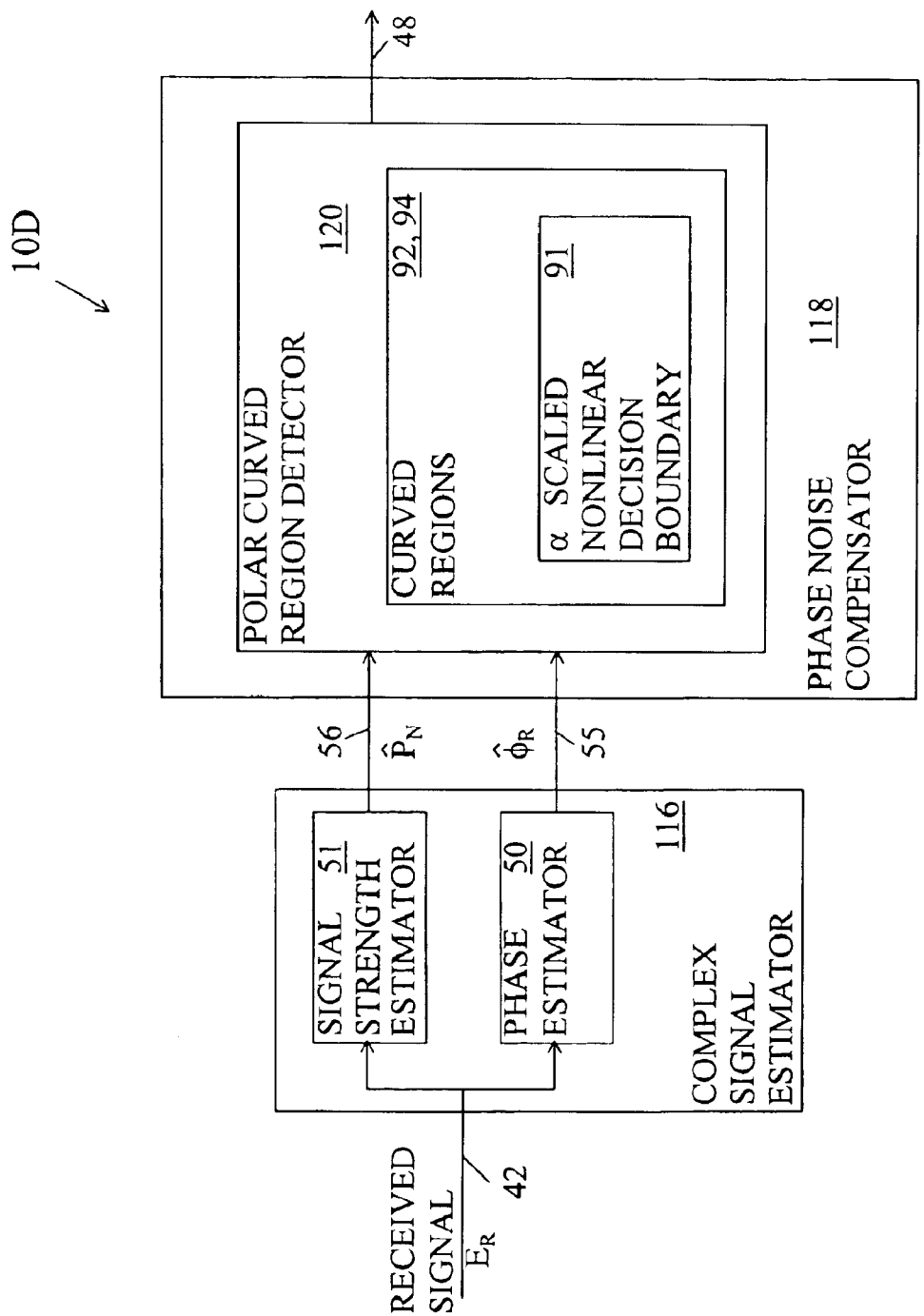
FIG. 8 is a block diagram of a receiver of the present invention having a phase estimator and an intensity-scaled phase noise compensator using the nonlinear decision boundary of FIG. 6.

FIG. 8 is a block diagram of a receiver of the present invention referred to by a reference identifier 10D. The receiver 10D receives the optical signal $E_R$ 42 and uses one or more of the nonlinear decision boundary curves 91 (FIG. 6) with the estimated polar coordinates $\hat{\phi}_R$ 55 and power $\hat{P}_N$ 56 for providing detected data 48 having a reduced level of unwanted nonlinear phase noise. The detected data 48 is a nonlinear phase noise compensated representation of the optical signal $E_R$ 42.

The receiver 10D includes a complex signal estimator 116 and a nonlinear phase noise compensator 118. The complex signal estimator 116 includes the phase estimator 50 for receiving the optical signal $E_R$ 42 and providing the estimated phase $\hat{\phi}_R$ 55 and the signal strength estimator 51 for receiving the optical signal $E_R$ 42 and providing the estimated power $\hat{P}_N$ 56.

The phase noise compensator 118 includes a polar curved region detector 120 having stored information for the curved regions 92 and 94. The region detector 120 issues the detected data 48 according to which particular one of the curved regions 92 and 94 encloses the complex location of the power $\hat{P}_N$ 56, corresponding to radius $\rho^2$, and the phase $\hat{\phi}_R$ 55.

The region detectors 108 and 118 can be implemented with look-up tables. Several look-up tables may be included where each table corresponds to curved regions, analogous to the curved regions 92 and 94, for different scale factors $\alpha$ for different levels, respectively, of the mean nonlinear phase $\langle\phi_{NL}\rangle$.

Figure 9:
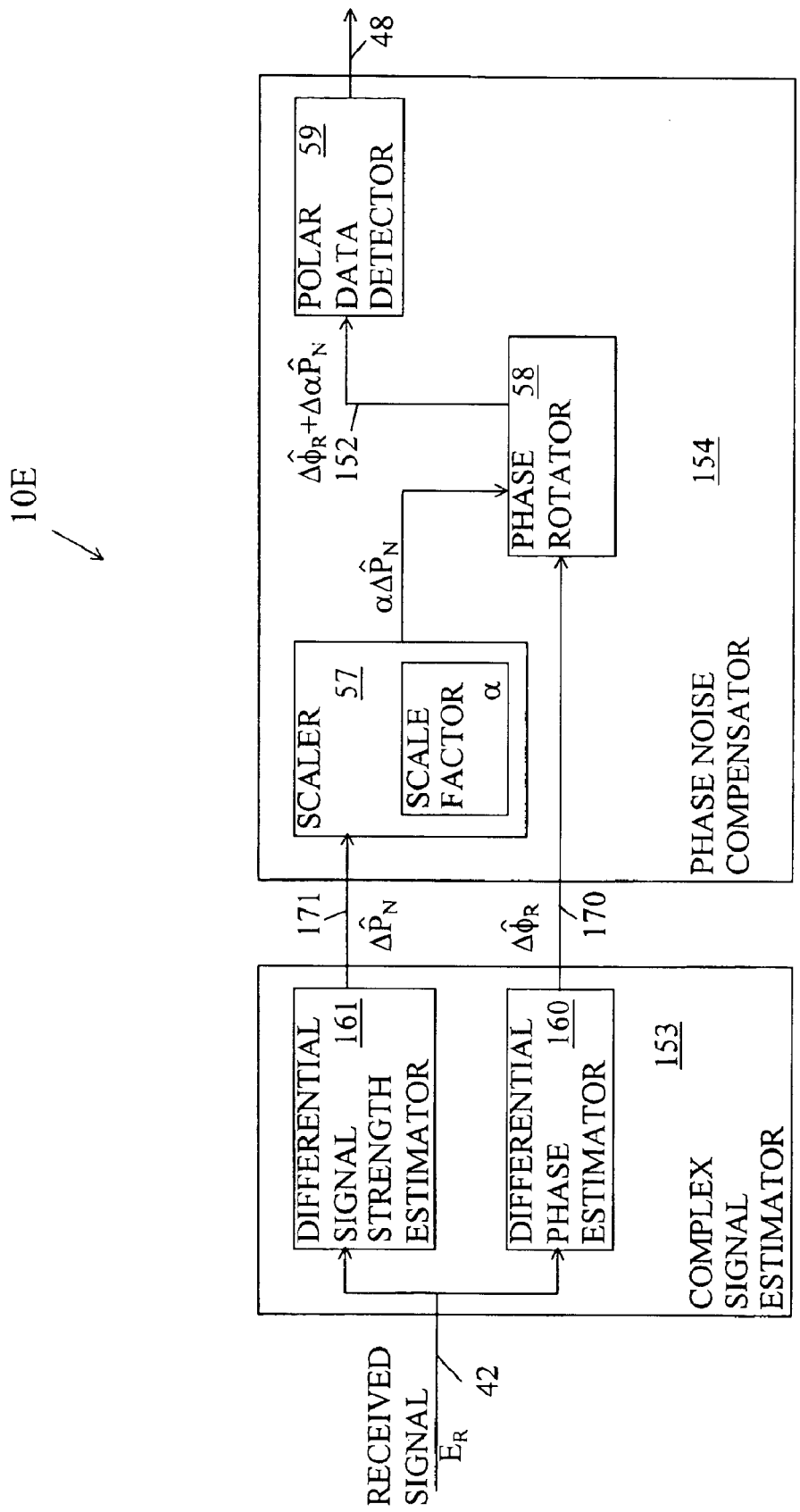
FIG. 9 is a block diagram of a receiver of the present invention having a differential phase estimator and an intensity-scaled phase noise compensator.

FIG. 9 is a block diagram of a receiver of another preferred embodiment of the present invention referred to by a reference identifier 10E. The receiver 10E receives the optical signal $E_R$ 42 and provides a differential nonlinear compensated phase, denoted by 152, having a reduced level of unwanted nonlinear phase noise. The compensated phase 152, shown below as $\Delta\hat{\phi}_R+\alpha\Delta\hat{P}_N$, is a nonlinear phase noise compensated representation of the optical signal $E_R$ 42.

The receiver 10E is intended for a differential phase-shifted keyed (DPSK) system. DPSK systems use the difference of the phase between two adjacent transmitted symbols to encode data. In DPSK systems, the data is encoded or modulated in $\phi(t+T)-\phi(t)$ of the carrier, where t is time and T is the symbol interval. As in a DPSK system, as in a BPSK system, the nonlinear phase shift due to the interaction of optical amplifier noise and Kerr effect degrades performance. Conventionally, the data is decoded using $\phi_R(t+T)-\phi_R(t)$ without using the information from the received intensity. In a DPSK system, the difference in nonlinear phase shift $\phi_{NL}(t+T)-\phi_{NL}(t)$ is also correlated with the difference in received intensity $P_N(t+T)-P_N(t)$ with the same correlation as that for BPSK system. A detector making decisions according to $\phi_R(t+T)-\phi_R(t)+\alpha[P_N(t+T)-P_N(t)]$ can be used to reduce the effect of nonlinear phase shift. The optimal combining factor $\alpha$ for DPSK system is the same as that for BPSK system.

The receiver 10E includes a complex signal estimator 153 for receiving the optical signal $E_R$ 42 and an intensity-scaled phase noise compensator 154 for providing the detected data 48. The complex signal estimator 153 includes a differential phase estimator 160 and a differential signal strength estimator 161. The differential phase estimator 160 estimates the differential phase $\Delta\phi_R=\phi_R(t+T)-\phi_R(t)$ of the optical signal $E_R$ 42 for providing an estimated differential phase $\Delta\hat{\phi}_R$, denoted with a reference identifier 170, corresponding to the difference between the phase $\phi_R(t)$ at a time t and the phase $\phi_R(t+T)$ at a time t+T, where T is a symbol time period. The signal strength estimator 161 estimates the differential power $\Delta P_N=P_N(t+T)-P_N(t)$ for providing an estimated differential power $\Delta\hat{P}_N$, denoted by 171, where $P_N=|E_N|^2=|E_R|^2$.

The phase noise compensator 154 includes the scaler 57, the phase rotator 58, and the polar data detector 59 operating on the differential phase $\Delta\hat{\phi}_R$ 170 and the differential power 171 in the manner as described above in the detailed description accompanying FIG. 4 for the phase $\hat{\phi}_R$ 55 and the power $\hat{P}_N$ 56. Information for the scale factor $\alpha$ is stored by the scaler 57. The scaler 57 multiplies the differential power $\Delta\hat{P}_N$ 171 by the scale factor $\alpha$ and passes the differential phase $\Delta\hat{\phi}_R$ and a scaled differential power $\alpha\Delta\hat{P}_N$ to the phase rotator 58. The phase rotator 58 adds the differential phase $\Delta\hat{\phi}_R$ and the scaled differential power $\alpha\Delta\hat{P}_N$ in order to rotate the differential phase $\Delta\hat{\phi}_R$ by the scaled differential signal strength $\alpha\Delta\hat{P}_N$. The rotated differential phase $\Delta\hat{\phi}_R+\alpha\Delta\hat{P}_N$ is the differential nonlinear compensated phase 152 of the received optical signal $E_R$ 42. The polar data detector 59 uses the differential nonlinear compensated phase $\Delta\hat{\phi}_R+\alpha\Delta\hat{P}_N$ 152 for providing the detected data 48. For binary DPSK modulation, the polar data detector 59 uses $\pi/2$ as a decision boundary, i.e., the decision is made based on whether the absolute value of the differential nonlinear compensated phase is less than or greater than $\pi/2$.

Figure 10:
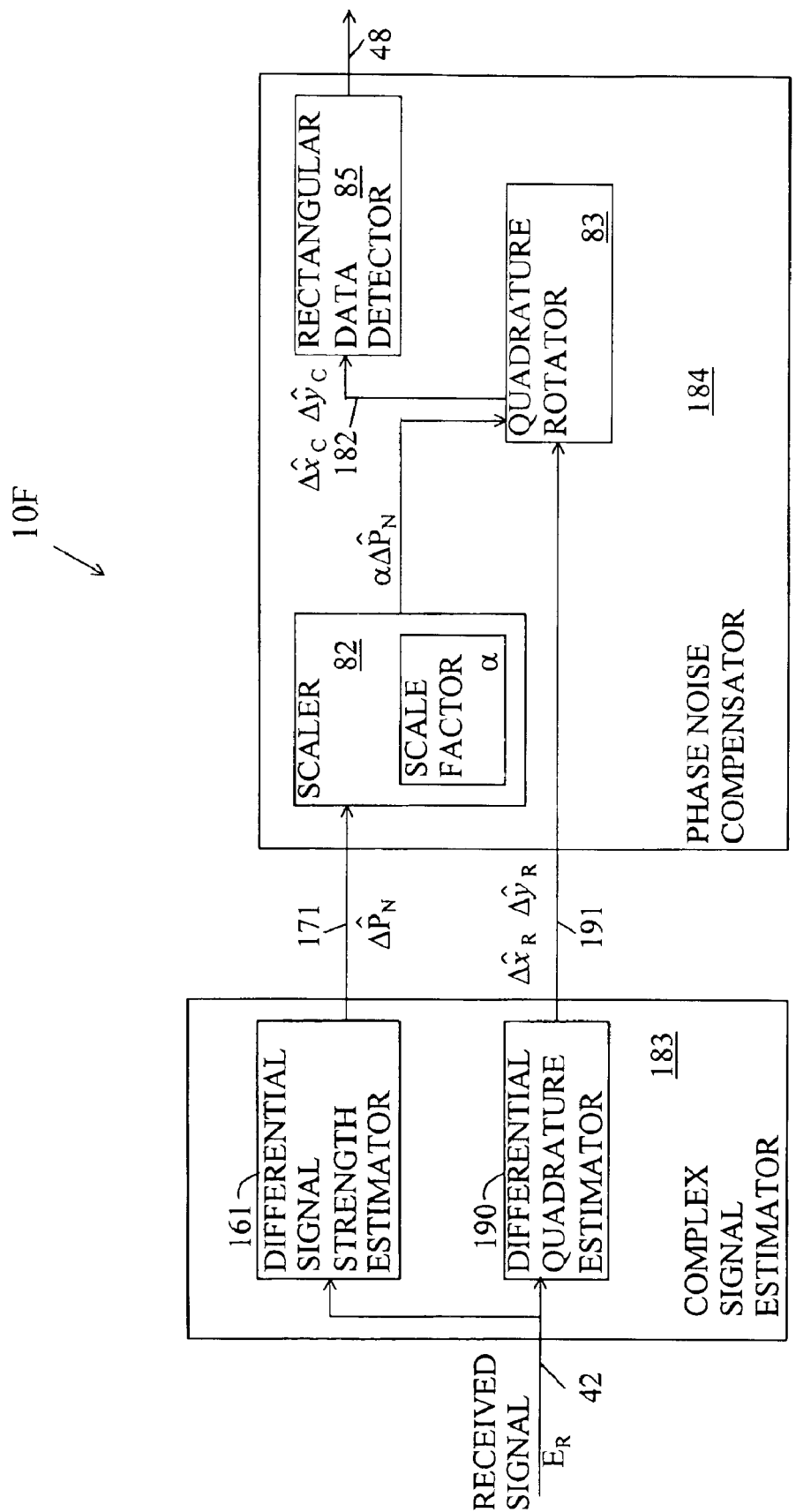
FIG. 10 is a block diagram of a receiver of the present invention having a differential quadrature estimator and an intensity-scaled phase noise compensator.

FIG. 10 is a block diagram of a receiver of another preferred embodiment of the present invention referred to by a reference identifier 10F. The receiver 10F receives the optical signal $E_R$ 42 and provides nonlinear phase noise compensated differential quadrature components $\Delta \hat{x}_c$ and $\Delta \hat{y}_c$, denoted by 182, having a reduced level of unwanted nonlinear phase noise. The compensated differential quadrature components $\Delta \hat{x}_c$ and $\Delta \hat{y}_c$ 182 are a nonlinear phase noise compensated representation of the optical signal $E_R$ 42.

The receiver 10F includes a complex signal estimator 183 for receiving the optical signal $E_R$ 42 and an intensity-scaled nonlinear phase noise compensator 184 for providing the detected data 48. The complex signal estimator 183 includes a differential quadrature estimator 190 and the differential signal strength estimator 161. The differential quadrature estimator 190 receives the electric field of $E_R$ 42 and estimates differential quadrature components $\Delta x_R = |E_R| \cos \Delta \phi_R$ and $\Delta y_R = |E_R| \sin \Delta \phi_R$ of the optical signal $E_R$ 42 for providing differential quadrature component estimates $\Delta \hat{x}_R$ and $\Delta \hat{y}_R$, denoted with a reference identifier 191, corresponding to the quadrature components of the differential phase of $\Delta \phi_R = \phi_R(t+T) - \phi_R(t)$. The differential signal strength estimator 161 receives the optical signal $E_R$ 42 and provides the estimated differential power $\Delta \hat{P}_N$ 171 that is the estimation of the actual differential power $\Delta P_N = P_N(t+T) - P_N(t)$.

The phase noise compensator 184 includes the scaler 82, the quadrature rotator 83, and the rectangular data detector 85. Information for the scale factor $\alpha$ is stored by the scaler 82. The scaler 82 multiplies the differential power $\Delta \hat{P}_N$ 171 by the scale factor $\alpha$ and passes the differential quadrature components $\Delta \hat{x}_R$ and $\Delta \hat{y}_R$ and a scaled differential power $\alpha \Delta \hat{P}_N$ to the quadrature rotator 83. The quadrature rotator 83 rotates the differential quadrature estimates $\Delta \hat{x}_R$ and $\Delta \hat{y}_R$ according to an equation 4, below, for providing rotated differential quadrature component estimates $\Delta \hat{x}_c$ and $\Delta \hat{y}_c$ as the compensated phase 182.

$$\Delta \hat{x}_c = \Delta \hat{x}_R \cos(\alpha \Delta \hat{P}_N) - \Delta \hat{y}_R \sin(\alpha \Delta \hat{P}_N)$$
$$\Delta \hat{y}_c = \Delta \hat{x}_R \sin(\alpha \Delta \hat{P}_N) + \Delta \hat{y}_R \cos(\alpha \Delta \hat{P}_N) \quad (4)$$

The rectangular data detector 85 uses the rotated quadrature components of $\Delta \hat{x}_c$ and $\Delta \hat{y}_c$ 182 for providing the detected data 48.

Figure 11:
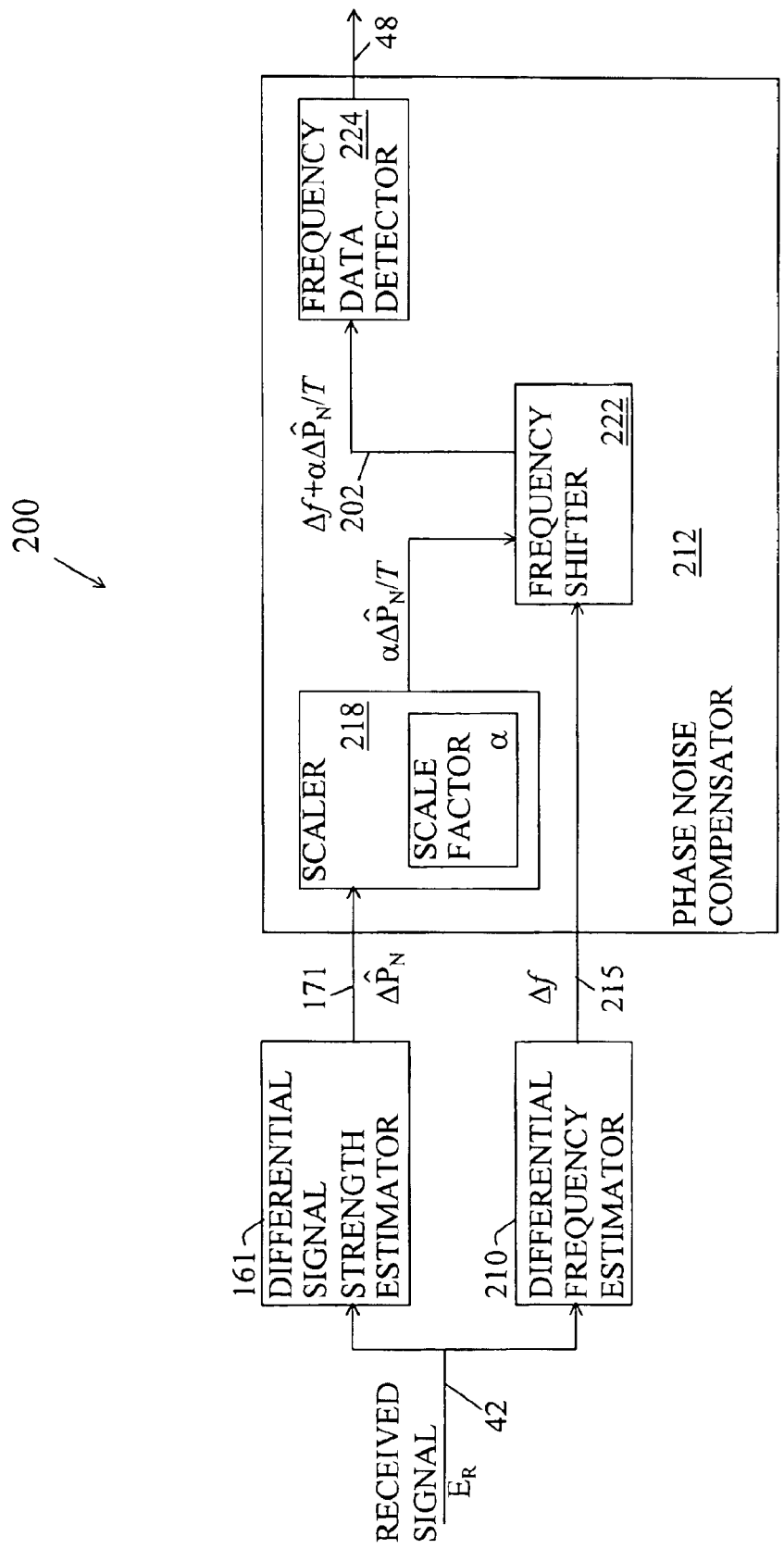
FIG. 11 is a block diagram of a receiver of the present invention having a differential frequency estimator and an intensity-scaled phase noise compensator.

FIG. 11 is a block diagram of a receiver of another preferred embodiment of the present invention referred to by a reference identifier 200. The receiver 200 receives the optical signal $E_R$ 42 and provides a nonlinear phase noise compensated frequency, denoted by 202, having a reduced level of unwanted nonlinear phase noise. The phase noise compensated frequency 202, shown below as $\Delta f + \alpha \Delta \hat{P}_N / T$, is a phase noise compensated representation of the optical signal $E_R$ 42.

Some optical communication systems use frequency to encode data, a technique referred to as frequency-shifted keying (FSK). In an FSK system, the data is encoded or modulated into the frequency that is equal to $d\phi(t)/dt$ where $d/dt$ denotes differentiation operation with respect to time. There are many different types of frequency estimators, most of them estimating the difference a carrier frequency and a frequency in a time interval between a time $t_0$ and a time $t_0 + T$, where the time T is a symbol time period. Usually, the output of a differential frequency estimator is proportional to a differential frequency $\Delta f = \hat{f}(t_0 + T) - \hat{f}(t_0)$, where $\hat{f}(t_0 + T)$ is the estimated frequency at $t_0 + T$, $\hat{f}(t_0)$ is the estimated frequency at $t_0$. The nonlinear phase noise correction to the differential frequency is $\alpha [P_N(t_0 + T) - P_N(t_0)]/T$. The optimal scale factor $\alpha$ for FSK is the scale factor $\alpha$ that is optimum for a BPSK system.

The receiver 200 includes a differential frequency estimator 210; the differential signal strength estimator 161 for receiving the optical signal $E_R$ 42; and an intensity-scaled phase noise compensator 212 for providing the detected data 48. The frequency estimator 210 receives the optical signal $E_R$ 42 and estimates the differential frequency that encoded the transmitted data for providing the estimated differential frequency $\Delta f$ described above and denoted as 215. The differential signal strength estimator 161 receives the optical signal $E_R$ 42 and provides information for the estimated differential power $\Delta \hat{P}_N$ 171 as described above.

The phase noise compensator 212 includes a scaler 218, a frequency shifter 222, and a frequency data detector 224. Information for the scale factor $\alpha$ is stored by the scaler 218. The scaler 218 multiplies the differential power $\Delta \hat{P}_N$ 171 by the scale factor $\alpha$ and divides by the symbol time period T for providing a scaled differential power $\alpha \Delta \hat{P}_N / T$ and passes the differential frequency $\Delta f$ and the scaled differential power $\alpha \Delta \hat{P}_N / T$ to the frequency shifter 222. The frequency shifter 222 adds the $\Delta f$ and $\alpha \Delta \hat{P}_N / T$ provided by the scaler 218 in order to shift the frequency $\Delta f$ by the scaled differential power $\alpha \Delta \hat{P}_N / T$. The shifted frequency $\Delta f + \alpha \Delta \hat{P}_N / T$ is the nonlinear phase noise compensated frequency 202 of the received optical signal $E_R$ 42. In the simple case of binary FSK, the detector makes the decision whether "1" or "0" is transmitted by the criterion whether the shifted frequency 202 is positive or negative. The frequency data detector 224 uses the shifted frequency 202 for detecting the modulated data that is carried on the optical signal $E_R$ 42 and issuing the estimate as the detected data 48.

Figure 12:
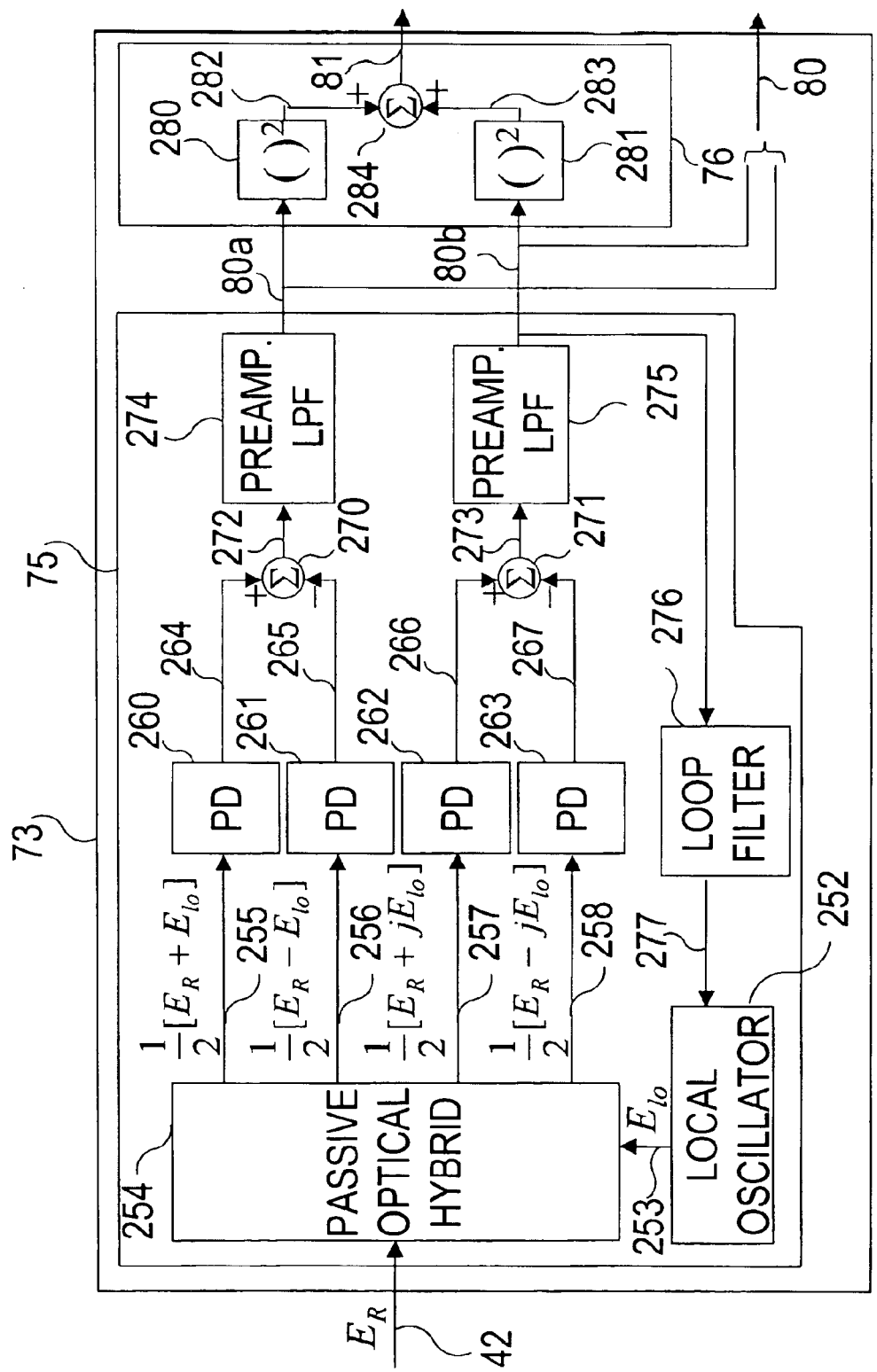
FIG. 12 is an exemplary detailed block diagram a quadrature estimator of a receiver of the present invention.

FIG. 12 is a block diagram of a detailed exemplary implementation of the complex signal estimator 73 illustrated in FIG. 5 for the receiver 10B. The complex signal estimator 73 includes the quadrature estimator 75 and the signal strength estimator 76.

The quadrature estimator 75 is implemented as a phase-locked homodyne receiver. A local oscillator 252 is a light source with an output $E_{lo}$ 253. When the local oscillator 252 is locked into the received signal 42, the optical frequency and phase of local oscillator output 253 is the same as that of the phase and carrier frequency of the received signal $E_R$ 42. In a practical implementation, a homodyne receiver typically includes some means to match the polarizations of the received optical electric field $E_R$ 42 and the local oscillator optical electric field $E_{lo}$ 253, but this polarization-matching means is omitted from FIG. 12 for simplicity.

A passive optical hybrid 254 combines the received optical signal $E_R$ 42 and the local oscillator field $E_{lo}$ 253 and gives four outputs, numbered 255, 256, 257, and 258, that are $\pi/2$ (90°) apart in phase. The four outputs are the zero-phase output of $(E_R + E_{lo})/2$ 255, the $\pi$-phase output of $(E_R - E_{lo})/2$ 256, the $\pi/2$-phase output of $(E_R + jE_{lo})/2$ 257, and the $-\pi/2$-phase output of $(E_R - jE_{lo})/2$ 258. Four photodetectors, numbered 260, 261, 262, and 263, are used to convert the combined optical signal of optical hybrid outputs 255, 256, 257, and 258, respectively, to four photocurrents, numbered 264, 265, 266, and 267. The zero- and $\pi$-phase photocurrents, numbered 264 and 265, respectively, are fed into a subtraction device 270. The $\pi/2$- and $-\pi/2$-phase photocurrents, numbered 266 and 267, respectively, are fed into a subtraction device 271. Outputs 272 and 273 of the subtraction device 270 and 271, respectively, are estimations of the quadrature components of the received optical signal $E_R$ 42. As both outputs 272 and 273 include wide-band electrical noise and are weak photocurrent, preamplifiers and low-pass filters, numbered 274 and 275, are used to amplify the signal and filter the high-frequency noise. An output 80a of preamplifier and low-pass filter 274 is the in-phase component estimate $\hat{x}_R$.

An output 80b of preamplifier and low-pass filter 275 is the quadrature-phase estimate $\hat{y}_R$. A loop filter 276 uses one of the quadrature components, in this case, the quadrature-phase quadrature component $\hat{y}_R$ 80b to give a control signal 277 to local oscillator 252. Using the control signal 277, the output 253 of local oscillator 252 is locked into the phase and frequency of the received optical signal $E_R$ 42. The output $\hat{x}_R$ 80a and the output $\hat{y}_R$ 80b are issued as the quadrature components 80 and provided to the signal strength estimator 76.

The signal strength estimator 76 uses quadrature components $\hat{x}_R$ and $\hat{y}_R$ denoted by 80a and 80b to estimate the received power and gives the estimated power output 81 of $\hat{P}_N = \hat{x}_R^2 + \hat{y}_R^2$. Two squaring devices, numbered 280 and 281, give the square of the two quadrature components of $\hat{x}_R^2$ 282 and $\hat{y}_R^2$ 283, respectively. A summing device 284 adds the outputs 282 and 283 of the squaring devices 280 and 281, respectively, and issues the power $\hat{P}_N = \hat{x}_R^2 + \hat{y}_R^2$ 81.

Figure 13:
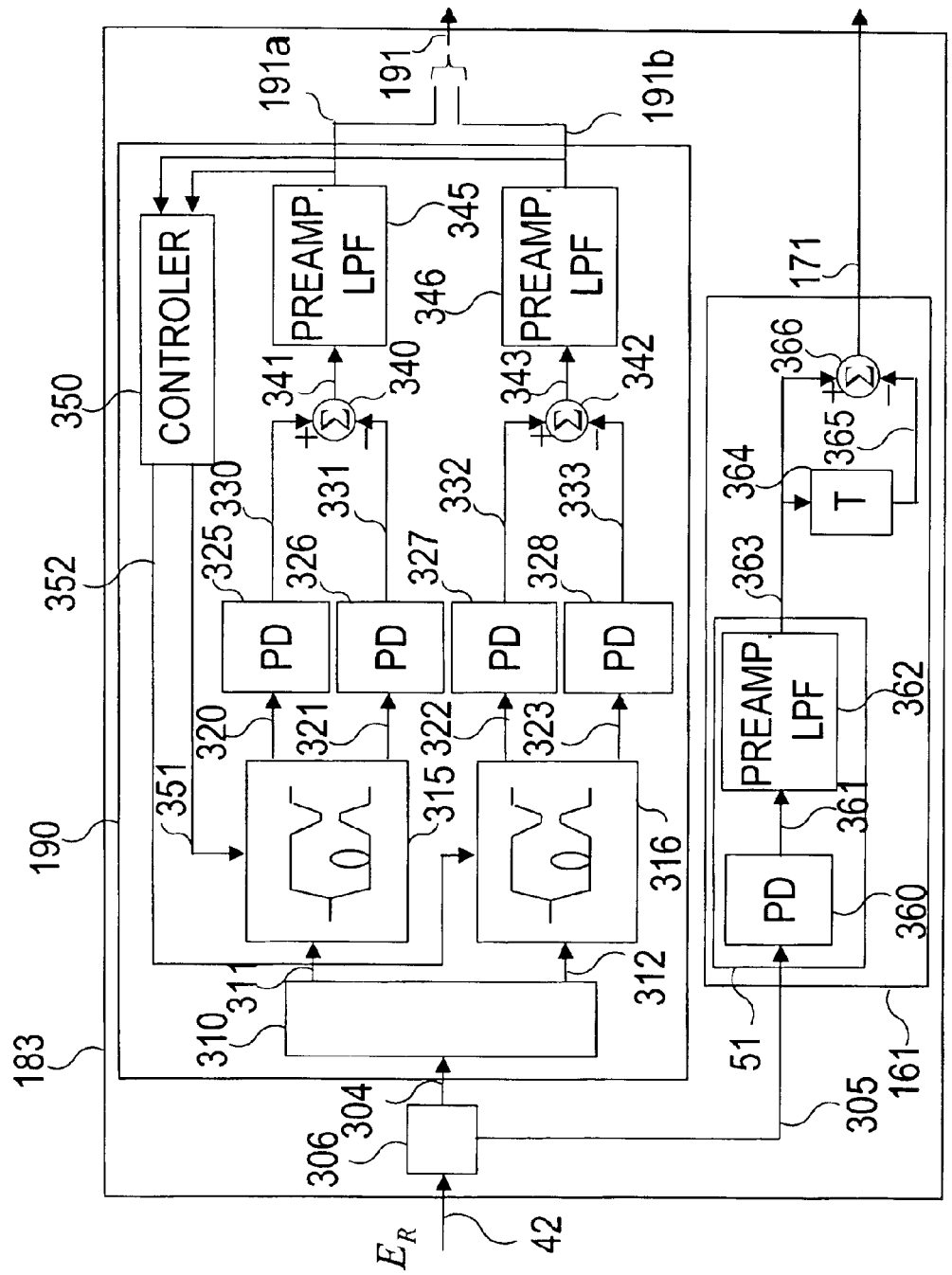
FIG. 13 is an exemplary detailed block diagram of a differential quadrature estimator of a receiver of the present invention.

FIG. 13 is block diagram of a detailed exemplary implementation of the complex signal estimator 183 illustrated in FIG. 10 for the receiver 10F. The complex signal estimator 183 includes the differential quadrature estimator 190 and the differential signal strength estimator 161.

The differential quadrature estimator 190 is implemented as an interferometric receiver. The received signal $E_R$ 42 is split into two outputs 304 and 305 using a splitter 306. The splitting ratio of splitter 306 can be chosen such that the power of one output signal 304 is larger than that in another output signal 305. The signal 304 is passed to the differential quadrature estimator 190. The signal 305 is passed to the differential signal strength estimator 161.

The differential quadrature component estimator 190 includes a splitter 310 for splitting the signal 304 into two equal-power outputs, numbered 311 and 312. The two splitter outputs of 311 and 312 are fed to two different interferometers, numbered 315 and 316, with different phase setting. Both interferometers 315 and 316 are Mach-Zehnder type interferometer that splits a signal into two branches, which propagate along paths of different path lengths and are recombined. The path length difference for the two interferometers 315 and 316 is approximately the symbol time T. The first interferometer 315 issues two output signals, numbered 320 and 321, that are proportional to $E_R(t)+E_R(t-T)$ and $E_R(t)-E_R(t-T)$ as the zero- and $\pi$-phase, respectively. The second interferometer 316 issues two output signals, numbered 322 and 323, that are proportional to $E_R(t)+jE_R(t-T)$ and $E_R(t)-jE_R(t-T)$ as the $\pi/2$- and $-\pi/2$-phase output, respectively. Four photo-detectors, numbered 325, 326, 327, and 328, are used to convert the optical signals 320, 321, 322, and 323, respectively, to four photocurrents, numbered 330, 331, 332, 333, respectively. The zero- and $\pi$-phase photocurrents 330 and 331 are fed into a subtraction device 340 to get their difference as 341. The $\pi/2$- and $-\pi/2$-phase photocurrents 332 and 333 are fed into a subtraction device 342 to get their difference as 343.

The outputs 341 and 343 of the subtraction devices 340 and 342, respectively, are estimations of the differential quadrature components. As both outputs of 341 and 343 have wide-band electrical noise and are weak photocurrent, preamplifiers and low-pass filters, numbered 345 and 346, are used to amplify the signal and filter the high-frequency noise. An output 191a of preamplifier and low-pass filter 345 is the in-phase differential estimate $\Delta\hat{x}_R$. The output 191b of preamplifier and low-pass filter 346 is the quadrature-phase estimate $\Delta\hat{y}_R$. The outputs 191a and 191b taken together comprise the differential quadrature components denoted as 191 in FIG. 10. A controller 350 uses both components $\Delta\hat{x}_R$ and $\Delta\hat{y}_R$ 191a and 191b for providing a control signal 351 to interferometer 315 and another control signal 352 to interferometer 316. The interferometers 315 and 316 use the control signals 351 and 352 to maintain the correct phase relationship.

The differential signal strength estimator 161 includes the signal strength estimator 51. The signal strength estimator 51 includes a photo-detector 360 to estimate the intensity of the received signal $E_R$ 42. A photocurrent 361 from the photo-detector 360 is amplified and filtered using a preamplifier and low-pass filter 362. An output 363 of the preamplifier and low-pass filter 362 is an estimation of the intensity of the received signal $E_R$ 42. The estimated power 363 is delayed by a symbol time of T by a delay device 364. A subtraction device 366 subtracts the delayed estimated power 365 from the current estimated power 363 for providing the differential power 171.

Figure 14:
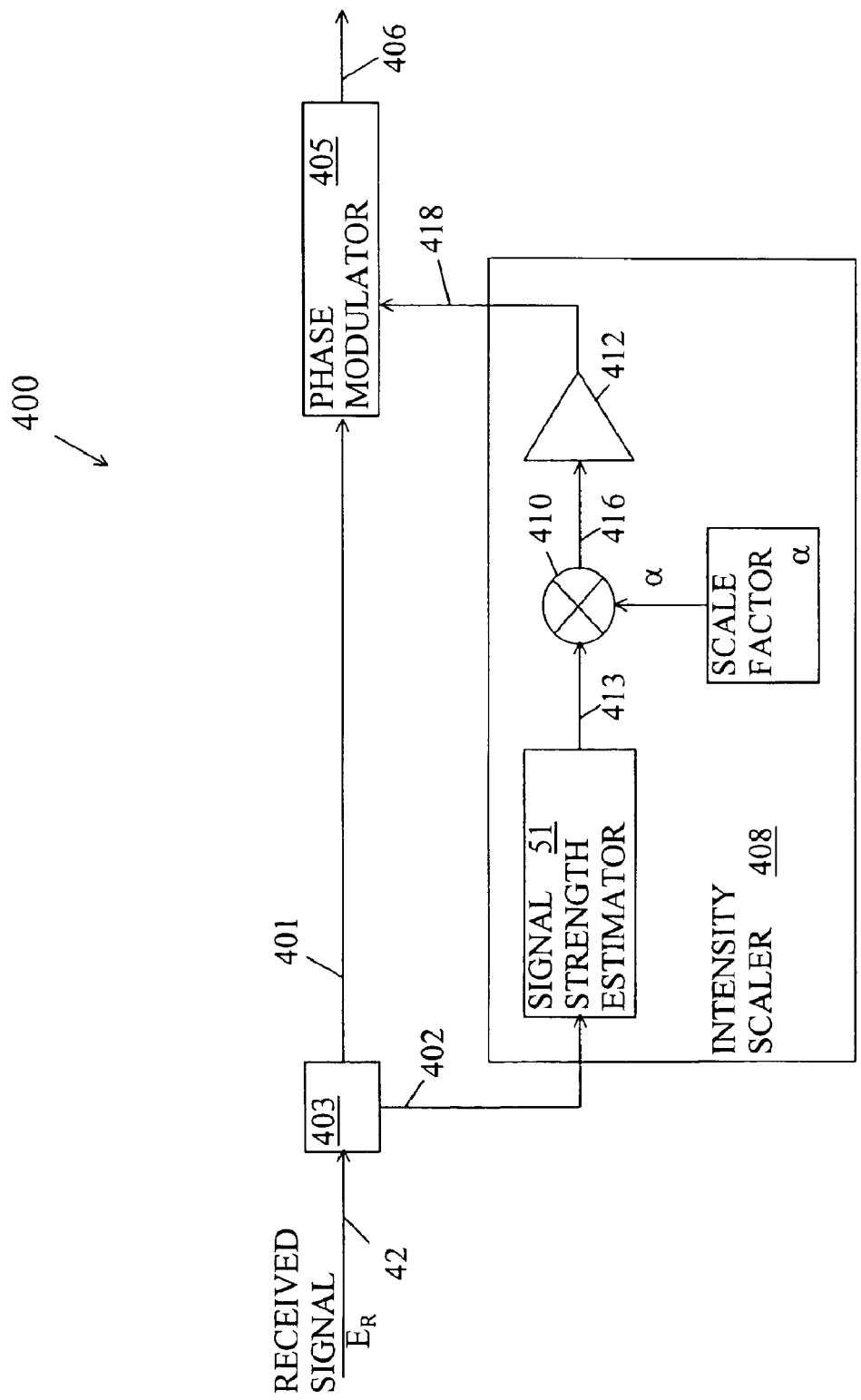
FIG. 14 is a block diagram of an intensity-scaled phase noise compensator of the present invention using a phase modulator.

FIG. 14 is a block diagram an intensity-scaled phase noise compensator of the present invention referred to by a reference identifier 400. The compensator 400 receives an optical signal $E_R$ 42 and provides a nonlinear phase noise compensated output optical signal, denoted by 406, having a reduced level of unwanted nonlinear phase noise. The output optical signal is a nonlinear phase noise compensated representation of the received optical signal $E_R$ 42.

The received optical signal $E_R$ 42 is split into first and second input signals 401 and 402 using a splitter 403. The splitting ratio of splitter 403 can be chosen such that the power of the first input signal 401 is larger than the power in the second input signal 402. The first input signal 401 is fed into an optical phase modulator 405 to give the output optical signal 406. The second input signal 402 is passed to an optical intensity scaler 408. The optical intensity scaler 408 includes the signal strength estimator 51, a multiplier 410, information for the scale factor $\alpha$, and a modulator driver 412. The signal strength estimator 51, preferably using a photodetector, a preamplifier and a low pass filter, estimates the power in the second input signal 402 for providing an estimated power 413. The multiplier 410 multiplies the estimated power 413 by the scale factor $\alpha$ for providing a correction voltage 416.

The correction voltage 416 is amplified by the modulator driver 412 to give a nonlinear phase noise compensation drive signal 418. The drive signal 418 drives the phase modulator 405 to modulate the first input signal 401 for providing the output optical signal 406. The output optical signal 406 is a nonlinear phase noise compensated representation of the received optical signal $E_R$ 42. The output optical signal 406 of the phase modulator 405 can be fed to a receiver for data detection or continue its propagation through spans of optical fiber. In a preferred embodiment the phase modulator 405 modulates phase at the frequency of the optical signal $E_R$ 42.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the present invention.

What is claimed is:

1. An optical phase noise compensator, comprising:
an intensity scaler for receiving an optical signal having Kerr effect nonlinear phase noise accumulated over one or more spans and providing an electrical scaled signal strength, said optical signal using optical signal phase for carrying information; and an optical phase modulator for modulating said received optical signal with said scaled signal strength for compensating said nonlinear phase noise and issuing an output optical signal using optical signal phase for carrying said information.

2. The compensator of claim 1, wherein:

said phase noise is induced by fiber nonlinearity in said spans.

3. The compensator of claim 1, wherein:

said phase noise is induced by additive noise in said spans.

4. The compensator of claim 1, wherein:

the intensity scaler includes a signal strength estimator for estimating a signal strength of said received optical signal and a multiplier for multiplying said signal strength by a scale factor for providing said scaled signal strength.

5. The compensator of claim 4, wherein:

said scale factor is a function of a number N of said spans.

6. The compensator of claim 5, wherein:

said scale factor is approximately one half a nonlinear coefficient of an optical fiber ($\gamma$) times an effective nonlinear length for one of said spans ($L_{eff}$) times a sum of one plus said N.

7. The compensator of claim 4, wherein:

said scale factor is approximately $$\gamma L_{eff} \frac{N+1}{2} \cdot \frac{|E_0|^2 + (2N+1)\sigma^2/3}{|E_0|^2 + N\sigma^2}$$

where said N is the number of said spans, said $\gamma$ is a nonlinear coefficient of an optical fiber, said $L_{eff}$ is an effective nonlinear length for one of said spans, said $E_0$ is a calculated power expected of said received optical signal without noise, and said $\sigma^2$ is a noise variance for one of said spans.

8. The compensator of claim 4, wherein:

said scale factor is approximately one-half the ratio of a mean nonlinear phase shift and a mean signal power of said received optical signal, said mean phase shift due to Kerr effect.

9. The compensator of claim 1, wherein:

said optical signal phase for carrying information is modulation selected from the group consisting of binary phase shift keying (BPSK), quadrature amplitude modulation (QAM), M-ary phase shift keying (MPSK), differential phase shift keying (DPSK), differential quadrature amplitude modulation, and frequency modulation.

10. A method for phase noise compensation comprising:

receiving an optical signal having Kerr effect nonlinear phase noise accumulated over one or more spans, said optical signal using optical signal phase for carrying information;

determining an electrical scaled signal strength for said received optical signal; and phase modulating said received optical signal with said scaled signal strength for compensating said nonlinear phase noise and issuing an output optical signal using optical signal phase for carrying said information.

11. The method of claim 10, wherein:

said phase noise is induced by fiber nonlinearity in said spans.

12. The method of claim 10, wherein:

said phase noise is induced by additive noise in said spans.

13. The method of claim 10, wherein:

the step of determining a scaled signal strength includes estimating a signal strength of said received optical signal; and multiplying said signal strength by a scale factor for providing said scaled signal strength.

14. The method of claim 13, wherein:

said scale factor is a function of a number N of said spans.

15. The method of claim 14, wherein:

said scale factor is approximately one half a nonlinear coefficient of an optical fiber ($\gamma$) times an effective nonlinear length for one of said spans ($L_{eff}$) times a sum of one plus said N.

16. The method of claim 13, wherein:

said scale factor is approximately $$\gamma L_{eff} \frac{N+1}{2} \cdot \frac{|E_0|^2 + (2N+1)\sigma^2/3}{|E_0|^2 + N\sigma^2}$$

where said N is the number of said spans, said $\gamma$ is a nonlinear coefficient of an optical fiber, said $L_{eff}$ is an effective nonlinear length for one of said spans, said $E_0$ is a calculated power expected of said received optical signal without noise, and said $\sigma^2$ is a noise variance for one of said spans.

17. The method of claim 13, wherein:

said scale factor is approximately one-half the ratio of a mean nonlinear phase shift and a mean signal power of said received optical signal, said mean phase shift due to Kerr effect.

18. The method of claim 10, wherein:

said optical signal phase for carrying information is modulation selected from the group consisting of binary phase shift keying (BPSK), quadrature amplitude modulation (QAM), M-ary phase shift keying (MPSK), differential phase shift keying (DPSK), differential quadrature amplitude modulation, and frequency modulation.

* * * * *